US009899667B2

(12) United States Patent
Chen et al.

(10) Patent No.: US 9,899,667 B2
(45) Date of Patent: Feb. 20, 2018

(54) ELECTRODE COMPOSITE MATERIAL, PREPARATION METHOD THEREOF, CATHODE AND BATTERY INCLUDING THE SAME

(71) Applicant: Positec Power Tools (Suzhou) Co., Ltd, Suzhou (CN)

(72) Inventors: Pu Chen, Waterloo (CA); Yongguang Zhang, Waterloo (CA); Zhumabay Bakenov, Waterloo (CA); Aishuak Konarov, Waterloo (CA); The Nam Long Doan, Waterloo (CA)

(73) Assignees: POSITEC POWER TOOLS (SUZHOU) CO., LTD, Suzhou, Jiangsu Province (CN); Pu Chen, W. Waterloo, Ontario (CA)

( * ) Notice: Subject to any disclaimer, the term of this patent is extended or adjusted under 35 U.S.C. 154(b) by 343 days.

(21) Appl. No.: 14/103,042

(22) Filed: Dec. 11, 2013

(65) Prior Publication Data

US 2014/0147738 A1     May 29, 2014

Related U.S. Application Data

(63) Continuation of application No. PCT/CN2012/076732, filed on Jun. 11, 2012.

(30) Foreign Application Priority Data

Jun. 11, 2011 (CN) ............... 2011 1 0156071
Feb. 7, 2012 (CN) ............... 2012 1 0026630
Feb. 13, 2012 (CN) ............... 2012 1 0031792
Feb. 13, 2012 (CN) ............... 2012 1 0031821
Feb. 14, 2012 (CN) ............... 2012 1 0031914

(51) Int. Cl.

| H01M 4/36 | (2006.01) |
| H01M 4/136 | (2010.01) |
| H01M 4/137 | (2010.01) |
| H01M 4/1397 | (2010.01) |
| H01M 4/1399 | (2010.01) |
| H01M 4/58 | (2010.01) |
| H01M 4/60 | (2006.01) |
| H01M 4/38 | (2006.01) |
| H01M 4/62 | (2006.01) |
| H01M 10/052 | (2010.01) |
| H01M 10/0565 | (2010.01) |
| H01M 4/131 | (2010.01) |
| H01M 4/133 | (2010.01) |
| H01M 4/1391 | (2010.01) |
| H01M 4/1393 | (2010.01) |
| H01M 4/583 | (2010.01) |
| H01M 10/0525 | (2010.01) |

(52) U.S. Cl.
CPC ........... *H01M 4/362* (2013.01); *H01M 4/131* (2013.01); *H01M 4/133* (2013.01); *H01M 4/136* (2013.01); *H01M 4/137* (2013.01); *H01M 4/1391* (2013.01); *H01M 4/1393* (2013.01); *H01M 4/1397* (2013.01); *H01M 4/1399* (2013.01); *H01M 4/364* (2013.01); *H01M 4/38* (2013.01); *H01M 4/583* (2013.01); *H01M 4/5815* (2013.01); *H01M 4/604* (2013.01); *H01M 4/608* (2013.01); *H01M 4/62* (2013.01); *H01M 4/625* (2013.01); *H01M 10/052* (2013.01); *H01M 10/0565* (2013.01); *H01M 10/0525* (2013.01)

(58) Field of Classification Search
CPC ........ H01M 4/364; H01M 4/38; H01M 4/137; H01M 4/362; H01M 4/1399; H01M 10/052; H01M 4/608; H01M 4/625; H01M 4/136; H01M 4/1397; H01M 4/604; H01M 10/0565; H01M 4/5815; H01M 4/62; Y02E 60/122
See application file for complete search history.

(56) References Cited

U.S. PATENT DOCUMENTS

| 4,664,991 A | 5/1987 | Perichaud et al. | |
| 2010/0239914 A1* | 9/2010 | Mikhaylik ............ | H01M 4/133 429/231.8 |

(Continued)

FOREIGN PATENT DOCUMENTS

| CN | 1396202 A | 2/2003 |
| CN | 101562261 A | 10/2009 |

(Continued)

OTHER PUBLICATIONS

European Search Report for Application No. EP12800709.3 dated Dec. 8, 2014, 3 pages.

(Continued)

*Primary Examiner* — Muhammad S Siddiquee
(74) *Attorney, Agent, or Firm* — Howard & Howard Attorneys PLLC

(57) ABSTRACT

An electrode composite material is disclosed in the invention. The electrode composite material comprises $AB_xC_yD_z$, wherein A is selected from at least one of polypyrrole, polyacrylonitrile, and polyacrylonitrile copolymer; B comprises sulfur; C is selected from carbon material; D is selected from metal oxides, $1 \leq x \leq 20$, $0 \leq y < 1$, and $0 \leq z < 1$. Comparing to the prior art, the conductivity of the electrode composite material is obviously increased, the material is dispersed uniformly and the size of the material is small. The electrochemical performance of the electrode composite material is improved. It has a good cycle life and high discharging capacity efficiency. A method for manufacturing the electrode composite material, a positive electrode using the electrode composite material and a battery including the same are also disclosed in the invention.

17 Claims, 19 Drawing Sheets

(56) References Cited

U.S. PATENT DOCUMENTS

| | | | | | |
|---|---|---|---|---|---|
| 2010/0304205 | A1* | 12/2010 | Jo | ............................ | H01G 9/02 429/144 |
| 2011/0059361 | A1* | 3/2011 | Wilkening | ............ | H01M 4/136 429/218.1 |
| 2011/0111295 | A1* | 5/2011 | Yamada | ................ | H01M 4/131 429/217 |
| 2011/0200875 | A1* | 8/2011 | Miyuki | ................... | C01B 31/04 429/213 |
| 2012/0183849 | A1* | 7/2012 | Matsuno | ................. | H01M 4/13 429/211 |
| 2014/0154589 | A1 | 6/2014 | Wegner et al. | | |

FOREIGN PATENT DOCUMENTS

| | | |
|---|---|---|
| CN | 101577323 A | 11/2009 |
| CN | 101662021 A | 3/2010 |
| CN | 101719545 A | 6/2010 |
| CN | 101891930 A | 11/2010 |
| CN | 101916849 A | 12/2010 |
| JP | 2010153296 A | 7/2010 |
| WO | 2012150060 A1 | 11/2012 |

OTHER PUBLICATIONS

English language abstract for WO 2012150060 extracted from espacenet.com database Feb. 26, 2015, 1 page. Also see English language equivalent US 20140154589.

Jiulin Wang et al., "Sulfur Composite Cathode Materials for Rechargeable Lithium Batteries", Advanced Functional Materials, Jun. 2003, pp. 487-492, Wiley-VCH Verlag GmbH & Co. kGaA, Weinheim.

M.S. Song et al., Effects of Nanosized Adsorbing Material on Electrochemical Properties of Sulfur Cathodes for Li/S Secondary Batteries, University of Wollongong Research Online, Journal of the Electrochemical Society, 2004, pp. A791-A795.

Yong Zhang et al., Effect of Nanosized Mg0.8Cu0.2O on electrochemical properties of Li/S rechargeable batteries, International Journal of Hydrogen Energy 34, 2009, 1556-1559, Published by Elsevier Ltd, Zhengzhou, Henan 450002, PR China.

English language abstract and translation for CN 1396202 extracted from espacenet.com database on Mar. 26, 2014, 16 pages.

English language abstract and translation for CN 101562261 extracted from espacenet.com database on Apr. 1, 2014,4 25 pages.

English language abstract and translation for CN 101577323 extracted from espacenet.com database on Mar. 26, 2014, 26 pages.

English language abstract and translation for CN 101662021 extracted from espacenet.com database on Apr. 1, 2014, 42 pages.

English language abstract and translation for CN 101719545 extracted from espacenet.com database on Apr. 1, 2014, 22 pages.

English language abstract and translation for JP 2010153296 extracted from espacenet.com database on Mar. 26, 2014, 44 pages.

English language abstract and translation for CN 101891930 extracted from espacenet.com database on Apr. 1, 2014, 18 pages.

English language abstract and translation for CN 101916849 extracted from espacenet.com database on Mar. 26, 2014, 16 pages.

International Search Report for Application No. PCT/CN2012/076732 dated Sep. 13, 2012, 1 page.

* cited by examiner

ELECTRODE COMPOSITE MATERIAL, PREPARATION METHOD THEREOF, CATHODE AND BATTERY INCLUDING THE SAME

RELATED APPLICATIONS

This application is a continuation of International Application No. PCT/CN2012/076732, filed on Jun. 11, 2012; which claims priority to: CN201110156071.7, filed on Jun. 11, 2011; CN201210026630.7, filed on Feb. 7, 2012; CN201210031792.X, filed on Feb. 13, 2012; CN201210031821.2, filed on Feb. 13, 2012; and CN201210031914.5, filed on Feb. 14, 2012, the disclosures of which are hereby incorporated by reference.

FIELD OF THE INVENTION

The present invention relates to an electrode composite material, a method for preparing the electrode composite material, a cathode containing the electrode composite material, as well as battery containing the electrode composite material.

BACKGROUND OF THE INVENTION

With the development of technology, energy especially renewable green energy is in great demand. Batteries as energy storage and conversion device are playing an irreplaceable role. Lithium-ion batteries are leading power sources due to their high weight and volume specific energy. The development of lithium-ion battery focuses on low cost, high energy density, long cycle life and green environmental protection.

Currently, the commercialized cathode material is lithium intercalation compounds with a layer structure (lithium cobalt oxide), spinel structure (lithium manganese oxide) or olivine structure. Lithium cobalt oxide ($LiCoO_2$) has high theoretical capacity of 275 mAh/g, along with high cost and toxicity, and its character of easy decomposition during overcharge may cause dramatically decrease of battery capacity and safety issues. Lithium manganese oxide ($LiMn_2O_4$) with theoretical capacity of 148 mAh/g, actually less than 130 mAh/g, is unstable, of which the crystal structure may deform during the charging and discharging process, resulting in low cycling efficiency; lithium iron phosphate ($LiFePO_4$) with theoretical capacity of 172 mAh/g has poor conductivity and reducing reversible capacity. The above conventional lithium-ion battery cathode materials cannot satisfy the requirement of battery development due to their capacity and some other problems.

Theoretical capacity of elemental sulfur is 1675 mAh/g which is much higher than those of commercialized cathode materials. The battery composed of sulfur and metal lithium has theoretical specific energy of 2600 mAh/g which is the main stream in battery development. Cathode materials containing elemental sulfur, sulfur-containing inorganic sulfides, organic sulfides, organic disulfides, organic polysulfides, or carbon-sulfur have been wildly researched by now, but some problems still exist therein.

Firstly, conductive agents have to be added due to the poor conductivity of sulfur and sulphide; secondly, solubility of polysulfides as discharge products in electrolyte may affect the cyclability of battery. Thus, researches on sulfur based cathode material focus on how to improve the conductivity and cyclability of materials solve the solubility problem of polysulfides as discharge products.

Chinese patent application CN101891930A provides a sulfur composite cathode material containing carbon nanotube, sulfur is embedded in the composite. The battery has enhanced capacity. But, the battery with high cost and complex process is not suitable for industrialization due to the use of high costly carbon nanotube.

SUMMARY OF THE INVENTION

The present invention aims to provide an electrode composite material with high capacity and reversible electrochemical performance.

Accordingly to one aspect, the invention provides an electrode composite material comprising $AB_xC_yD_z$, A being selected from at least one of polypyrrole, polyacrylonitrile, and polyacrylonitrile copolymer; B being selected from sulfur; C being selected from carbon based materials; D being selected from metal oxides; $1 \leq x \leq 20$, $0 \leq y < 1$, and $0 \leq z < 1$.

Preferably, $y=0$, $0 < z < 1$.

Preferably, $0 < y < 1$, $0 < z < 1$.

Preferably, the polyacrylonitrile copolymer is selected from at least one of polyacrylonitrile methylmethacrylate copolymer, and polyacrylonitrile polypyrrole copolymer.

Preferably, the carbon based material is selected from at least one of ketjen black, Acetylene black, active carbon, single wall carbon nano-tube, multi wall carbon nano-tube and graphene.

Preferably, the metal oxide is selected from at least one of $Mg_aNi_bO$, $MgO$, $NiO$, $V_2O_5$, $CuO$, $Mg_cCu_dO$, $La_2O_3$, $Zr_2O_3$, $Ce_2O_3$, and $Mn_2O_f$; $0<a<1$, $0<b<1$, $a+b=1$; $0<c<1$, $0<d<1$, $c+d=1$; the value of f is 2 or 3 or 4 or 7.

According to one aspect, the invention provides a cathode for battery, comprising an electrode composite material, the electrode composite material comprising $AB_xC_yD_z$, A being selected from at least one of polypyrrole, polyacrylonitrile, and polyacrylonitrile copolymer; B being selected from sulfur; C being selected from carbon based materials; D being selected from metal oxides; $1 \leq x \leq 20$, $0 \leq y < 1$, and $0 \leq z < 1$.

Preferably, $y=0$, $0 < z < 1$.

Preferably, $0 < y < 1$, $0 < z < 1$.

Preferably, the polyacrylonitrile copolymer is selected from at least one of polyacrylonitrile methylmethacrylate copolymer, and polyacrylonitrile polypyrrole copolymer.

Preferably, the carbon based material is selected from at least one of ketjen black, Acetylene black, active carbon, single wall carbon nano-tube, multi wall carbon nano-tube and graphene.

Preferably, the metal oxide is selected from at least one of $Mg_aNi_bO$, $MgO$, $NiO$, $V_2O_5$, $CuO$, $Mg_cCu_dO$, $La_2O_3$, $Zr_2O_3$, $Ce_2O_3$, and $Mn_2O_f$; $0<a<1$, $0<b<1$, $a+b=1$; $0<c<1$, $0<d<1$, $c+d=1$; the value of f is 2 or 3 or 4 or 7.

According to one aspect, the invention provides a battery, comprising a cathode, an anode and an electrolyte provided between the cathode and anode, the cathode comprising a cathode current collector and an electrode composite material, the electrode composite material comprising $AB_xC_yD_z$, A being selected from at least one of polypyrrole, polyacrylonitrile, and polyacrylonitrile copolymer; B being selected from sulfur; C being selected from carbon based materials; D being selected from metal oxides; $1 \leq x \leq 20$, $0 \leq y < 1$, and $0 \leq z < 1$.

Preferably, $y=0$, $0 < z < 1$.

Preferably, $0 < y < 1$, $0 < z < 1$.

Preferably, the polyacrylonitrile copolymer is selected from at least one of polyacrylonitrile methylmethacrylate copolymer, and polyacrylonitrile polypyrrole copolymer.

Preferably, the carbon based material is selected from at least one of ketjen black, Acetylene black, active carbon, single wall carbon nano-tube, multi wall carbon nano-tube and graphene.

Preferably, the metal oxide is selected from at least one of $Mg_aNi_bO$, MgO, NiO, $V_2O_5$, CuO, $Mg_cCu_dO$, $La_2O_3$, $Zr_2O_3$, $Ce_2O_3$, and $Mn_2O_f$; $0<a<1$, $0<b<1$, $a+b=1$; $0<c<1$, $0<d<1$, $c+d=1$; the value of f is 2 or 3 or 4 or 7.

Preferably, the electrolyte is selected from one of polyvinylidene fluoride, polyvinylidene fluoride-poly(methyl methacrylate) copolymer, polyvinylidene fluoride-hexafluoropropylene copolymer, and polyethylene glycol boric acid ester polymers.

Preferably, the cathode current collector is selected from one of Aluminum foil, Nickel foam, and stainless steel net.

Accordingly to one aspect, the invention provides a method for preparing an electrode composite material comprising the following steps:

dispersing sulfur in a first solvent to get a first solution; adding at least one of polypyrrole, polyacrylonitrile, and polyacrylonitrile copolymer into a second solvent to get a second solution; mixing the first solution, the second solution and at least one of a metal oxide by ball milling in an inert atmosphere to get a mixture; drying the mixture to remove the solvents therein; and then, heat-treating the mixture in a protective gas, cooling to get the electrode composite material; the first solvent being selected from one of carbon disulfide, toluene, and liquid hydrocarbon; the second solvent being selected from one of dimethylformamide, dimethyl acrylamide, a mixture of dimethyl acrylamide and lithium chloride, and dimethyl sulfoxide.

Accordingly to one aspect, the invention provides a method for preparing an electrode composite material comprising the following steps:

dispersing sulfur in a first solvent to get a first solution; soaking carbon based material into the first solution and vacuum drying to remove the solvent therein to get a first mixture; mixing the first mixture, at least one of a metal oxide, at least one of polypyrrole, polyacrylonitrile, and polyacrylonitrile copolymer by ball milling in an inert atmosphere to get a second mixture; vacuum drying the second mixture to remove the solvents therein; heat-treating the second mixture in a protective gas and then cooling to get the electrode composite material; the first solvent being selected from one of carbon disulfide, toluene, and liquid hydrocarbon.

Accordingly to one aspect, the invention provides a method for preparing an electrode composite material comprising the following steps:

dispersing sulfur in a first solvent to get a first solution; soaking carbon based material into the first solution and vacuum drying to remove the solvent therein to get a first mixture; adding at least one of polypyrrole, polyacrylonitrile, and polyacrylonitrile copolymer into a second solvent to get a second solution; mixing at least one of a metal oxide, the first mixture and the second solution by ball milling in inert atmosphere to get a second mixture; drying the second mixture to remove the solvents therein; heat-treating the second mixture in a protection gas, then cooling to get the electrode composite material; the first solvent being selected from one of carbon disulfide, toluene, and liquid hydrocarbon; the second solvent being selected from one of dimethylformamide, dimethyl acrylamide, a mixture of dimethyl acrylamide and lithium chloride, and dimethyl sulfoxide.

Preferably, the metal oxide is $Mg_aNi_bO$, $0<a<1$, $0<b<1$, $a+b=1$.

Accordingly to one aspect, the invention provides a method for preparing an electrode composite material comprising the following steps:

mixing at least one of polypyrrole, polyacrylonitrile, and polyacrylonitrile copolymer, and at least one of metal oxides in solvent to get a first mixture; ball milling the first mixture to get a second mixture, vacuum drying the second mixture, and then heat-treating in protective gas or vacuum atmosphere, cooling to get the electrode composite material.

Preferably, the metal oxide comprises a mixture of MgO and NiO, or a mixture of MgO and CuO.

Preferably, the rotation speed range of the ball milling is 200-1300 rpm, the duration of ball milling is 0.5-12 h.

Preferably, the temperature of the heat-treating is 150-450° C., the duration of the heat-treating is 1-20 h.

Preferably, the temperature of the vacuum drying is 35-75° C., the duration of the vacuum drying time is 3-12 h.

Preferably, the protective gas is selected from one of Ar, $N_2$, a reductive gas mixture of Ar and $H_2$, and a reductive gas mixture of $N_2$ and $H_2$.

The method provided in the present invention for preparing an electrode composite material comprises solution method and mechanical ball milling, so that each component of the electrode composite material can be more uniformly dispersed. The conductivity and electrochemical performance of sulfur based electrode composite material is obviously enhanced due to the addition of carbon based material and metal oxides.

Accordingly to one aspect, the invention provides a method for preparing an electrode composite material comprising element sulfur, at least one of polyacrylonitrile and polyacrylonitrile copolymer, comprising the following steps:

Mixing sulfur, at least one of polyacrylonitrile and polyacrylonitrile copolymer, the resultant being heat-treated in an inert gas or vacuum atmosphere at the temperature range of 250-350° C., for no less than 1 h, then the electrode composite material being obtained.

Preferably, the polyacrylonitrile copolymer is selected from at least one of polyacrylonitrile methylmethacrylate copolymer and polyacrylonitrile polypyrrole copolymer.

Preferably, the weight ratio range of sulfur in the electrode composite material is 70-80%.

Preferably, the weight ratio of sulfur and at least one of polyacrylonitrile and polyacrylonitrile copolymer is 4:1.

Preferably, the inert gas is selected from Ar, or $N_2$.

Preferably, the sulfur and at least one of polyacrylonitrile and polyacrylonitrile copolymer are manually mixed.

Preferably, the duration of manual mixing is 1-30 minutes.

Ball milling which is time and energy consuming is skipped from the method provided in the present invention for preparing the electrode composite material, which prevent the structure of polymer from damaging. The method is simple and easy to operate, and the electrode composite material prepared thereby exhibits excellent property.

Accordingly to one aspect, the invention provides a method for preparing an electrode composite material comprising element sulfur and polyacrylonitrile, comprising the following steps:

Sulfur and polyacrylonitrile being mechanically mixed, then dried in a vacuum atmosphere, the resultant being heat-treated in an inert gas or a vacuum atmosphere at 250-350° C. for 0.5-4 h, then the electrode composite material being obtained.

Preferably, the mechanical mixing is conducted by ball milling.

Preferably, the duration of the heat-treatment is 2.5 h.

Preferably, the weight ration of sulfur and polyacrylonitrile is 4:1.

Preferably, the temperature of vacuum drying is 50-80° C.

Preferably, the duration of vacuum drying is 1-3 hours.

The electrode composite material obtained by the method in the present invention exhibits excellent electrochemical properties and thermal stability, and the method is simple and suitable for industrialization.

Accordingly to one aspect, the invention provides a method for preparing an electrode composite material comprising element sulfur and polypyrrole, comprising the following steps:

Sulfur and polypyrrole being mechanically mixed, and then the electrode composite material being obtained.

Preferably, Sulfur has a nano or micro particles.

Preferably, polypyrrole has a branched nanostructure.

Preferably, the diameter distribution range of polypyrrole is 25-150 nm.

Preferably, the duration of ball-milling is 1-6 h.

Preferably, the rotation speed of the ball-milling is 200-1200 rpm.

Preferably, polypyrrole is synthesized as described below: pyrrole monomer is added into the cetyltrimethylammonium bromide solution, and stirred. Subsequently, aqueous solution of ammonium persulfate is added, and the solution is stirred for 12-24 h. All synthesis procedures are carried out at a temperature range between 0-5° C. The final precipitate of PPy is separated via filtration, thoroughly washed and then dried.

Preferably, the drying is carried out in a vacuum atmosphere.

Preferably, the temperature range of the drying is 50-100° C.

Preferably, the duration of the drying is 12-24 h.

The method of preparing the electrode composite material provided in the present invention comprises a simple one-step ball-milling without heat-treatment which may cause the loss of sulfur. As a result, the utilization of the electrode composite material is improved and the method process is simplified, the method provided in the present invention for preparing lithium ion battery with high performance sulfur based cathode has promising prospect.

BRIEF DESCRIPTION OF THE DRAWINGS

The features of the invention will become more apparent in the following detailed description in which reference is made to the appended drawings wherein.

DETAILED DESCRIPTION OF THE INVENTION

Figure 1:
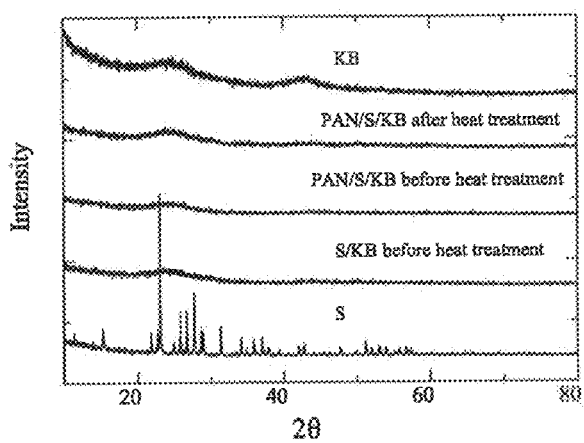
FIG. 1 shows the XRD spectra of sulfur, KB and the composites S/KB and PAN/S/KB.

In one aspect, the present invention provides an electrode composite material with high capacity and good electrochemical reversibility.

An electrode comprises $AB_xC_yD_z$, A is selected from at least one of polypyrrole (PPy), polyacrylonitrile (PAN) and polyacrylonitrile copolymer; B is element sulfur; C is selected from carbon based material; D is selected from metal oxides; wherein, $1 \leq x \leq 20$, $0 \leq y < 1$, and $0 \leq z < 1$.

Polyacrylonitrile copolymer is selected from at least one of polyacrylonitrile methylmethacrylate copolymer and PAN-PPy copolymer. PPy with excellent conductivity is wildly used in the surface modification of electrode and electrode materials. The pyrolysis reaction of PAN at 200-300° C. comprises the process of cyclization of nitrile groups, dehydrogenation, conjugating and cross-linking etc., and conjugated polypyrrole with excellent conductivity is formed. The low temperature pyrolysis nature of PAN provides a good support for the preparation of electrode composite material. Both PAN-methyl methacrylate copolymer with PAN unit and PAN-Ppy combined with the double properties of PAN and Ppy could be used as a support for the electrode composite material. Meanwhile, the content of A in the electrode composite material is no more than 20% by weight. Specifically, A is PAN.

Carbon based material is selected from at least one of ketjen black (KB), acetylene black, active carbon, single wall carbon nanotube, multi-wall carbon nanotube and graphene. Carbon based materials are generally characterized by a large surface area, strong adsorption function, and the excellent electrical conductivity, which is suitable as a conductive additive. According to one embodiment, carbon based material is KB. The particle size of KB is about 30 nm, while along with high specific surface area of 1400 $m^2/g$ and a strong adsorption capacity. The addition of KB not only improve the conductivity of material, but also effectively restrain the agglomeration of composite during the preparation process due to its large specific surface area and strong adsorption capacity, which ensure that the composite has smaller particle size and uniformly distribute. So the diffusion path of lithium ions is shortened and the conductivity of composite is improved. In addition, the cost of KB is relatively cheap; the cost of the composite electrode containing KB is also low and of practicality.

Metal oxides comprises at least one of $Mg_aNi_bO$, MgO, NiO, $V_2O_5$, CuO, $Mg_cCu_dO$, $La_2O_3$, $Zr_2O_3$, $Ce_2O_3$ and $Mn_2O_f$, wherein, $0<a<1$, $0<b<1$, $a+b=1$; $0<c<1$, $0<d<1$, $c+d=1$; the value of f is 2 or 3 or 4 or 7. More specifically, $Mg_aNi_bO$ comprises but not limited to $Mg_{0.6}Ni_{0.4}O$; $Mg_cCu_dO$ comprises but not limited to $Mg_{0.8}Cu_{0.2}O$.

The improved conductivity of the electrode composite material and the suppression of dissolving of intermediate product polysulfides are due to the addition of metal oxides, which improve the utilization of sulfur and cycle ability of battery.

According to one embodiment, the metal oxides comprise a mixture of MgO and NiO, or a mixture of MgO and CuO. For the electrode composite material, the effect of mixture containing MgO and NiO and mixture containing MgO and CuO may equal to that of $Mg_{0.6}Ni_{0.4}O$ and $Mg_{0.8}Cu_{0.2}O$, but the mixture containing MgO and NiO, or MgO and CuO is superior in preparation technique.

Though element sulfur has high theoretical capacity, sulfur is an electron and ion insulator at room temperature. Lithium-sulfur battery containing sulfur as cathode is impossible charged and discharged at room temperature. Therefore, an electron and ion conductor must be added into the sulfur cathode. The sulfur-containing electrode composite provided in the present invention aims to improve the conductivity of sulfur-containing electrode composite material, and also improve the capacity and cycle ability of the electrode.

According to one aspect of the invention, an electrode composite $AB_xC_yD_z$, A is selected from at least one of polypyrrole (PPy), polyacrylonitrile (PAN) and polyacrylonitrile copolymer; B is element sulfur; C is selected from carbon based material; D is selected from metal oxides; wherein, $1 \leq x \leq 20$, $y=0$, and $0<z<1$.

According to one aspect of the invention, an electrode composite $AB_xC_yD_z$, A is selected from at least one of polypyrrole (PPy), polyacrylonitrile (PAN) and polyacrylonitrile copolymer; B is element sulfur; C is selected from carbon based material; D is selected from metal oxides; wherein, $1 \leq x \leq 20$, $0<y<1$, and $0<z<1$.

According to one embodiment, the electrode composite material comprises a binary composite PAN/S containing PAN and S.

According to a preferable embodiment, the electrode composite material comprises a ternary composite PAN/S/KB containing PAN, S and KB.

According to a more preferable embodiment, the electrode composite material comprises a quaternary composite PAN/S/KB/$Mg_{0.6}Ni_{0.4}O$ containing PAN, S, KB and metal oxides.

Disclosed is a cathode for battery, the electrode composite material described above used as cathode active material is combined with a cathode current collector to form the cathode.

Disclosed is a battery, comprising a cathode, an anode and an electrolyte between the cathode and anode.

The cathode comprises a cathode current collector and a cathode active material. The cathode active material comprises the electrode composite material described above; the weight rate range of the electrode composite material in the cathode active material is 50-90%, wherein the cathode further comprises a conductive agent and a binder. Preferably, the electrode composite material in the cathode active material is 80% by weight.

The conductive agent comprises at least one of conductive polymer, active carbon, graphene, carbon black, carbon fibre, metal fibre, metal powder and metal sheet. In a preferable embodiment, the conductive agent is KB.

The binder comprises one of polyethylene oxide, polypropylene oxide, polyacrylonitrile, polyimides, polyesters, polyethers, fluorinated polymers, polydivinyl polyethylene glycol, polyethylene glycol diacrylate, polyethylene glycol dimethacrylate, a combination thereof and derivatives. In one embodiment, the binder is polyvinylidene fluoride (PVDF). The weight rate range of the binder in the cathode active material is 1-30%.

The cathode current collector comprises but not limited to one of nickel foam, aluminum foil, and stainless steel net. Preferably, the cathode current collector is nickel foam.

The anode comprises an anode current collector and an anode active material which comprises but not limited to one of metal lithium, lithium alloys, lithium carbide and silicon based material. The anode current collector comprises but not limited to copper foil, copper net, aluminum foil, nickel foam and stainless steel net. When the anode active material is lithium, lithium itself can be used as an anode current collector. Lithium alloys include lithium-aluminum alloy, lithium-magnesium alloy and lithium-tin alloy; carbon based material in the lithium carbide comprises but not limited to one of crystalline carbon, amorphous carbon, and a mixture thereof.

Silicon based material is selected from at least one of silicon, silicon alloy, silicon coated with metal, silicon doped with metal. Silicon alloy comprises silicon-carbon alloy, silicon-lithium alloy and silicon-manganese. In order to improve the electron conductivity, silicon is coated or doped with metal which comprises but not limited to copper, tin and silver. According to an embodiment, silicon coated with metal is 3D porous silicon coated with silver.

In order to ensure that lithium ions exist in the cathode or anode in the process of charge and discharge, cathode or anode should be pre-intercalated with lithium ions if sulfur based cathode and silicon based anode contains no lithium ions. The method of pre-intercalating treatment comprises but not limited to chemical reaction and electrochemical reaction.

Electrolyte at least comprises a lithium salt and a mixed organic solvent. According to a embodiment, 1 M $LiPF_6$ in a solution of ethylene carbonate (EC):dimethyl carbonate (DMC):diethylene carbonate (DEC) is used as a liquid electrolyte.

The lithium salts comprise but not limited to lithium hexafluorophosphate ($LiPF_6$), lithium tetrafluoroborate ($LiBF_4$), lithium perchlorate ($LiClO_4$), lithium trifluoromethanesulfonate ($LiCF_3SO_3$), bistrifluoromethanesulfonimide lithium salt ($LiN(CF_3SO_2)_2$). The addition of lithium salts in electrolyte can effectively increase the ionic conductivity of the electrolyte.

The solvent of electrolyte can be a normal organic solvent, for example, dimethoxy ethane (DME), ethylene carbonate (EC), diethylene carbonate (DEC), propylene carbonate (PC), 1,3-dioxolane (DIOX), ether, Bis(2-methoxyethyl)ether, lactone, Sulfone, Sulfolane or a mixture thereof. Moreover, the solvent can be a polymer, such as polyvinylidene difluoride (PVDF), polyvinylidene difluoride-polymethylmethacrylate copolymer (PVDF-PMMA), polyvinylidene difluoride hexafluoropropylene copolymer (PVDF-HFP), polyethylene glycol borate esters (PEG-borate esters).

Electrolyte in gel state is helpful for preventing the leakage of electrolyte and avoiding environmental contamination, along with improving the safety of the battery. In one aspect of the invention, a separator may be provided with the battery structure. In such case, the separator may comprise an organic or inorganic porous material. In one aspect, the separator has a porosity of 20~95% and includes pores having a pore size of 0.001-100 μm.

In one aspect of the invention, the cathode slurry is prepared by mixing the electrode composite material, KB as conductive agent, PVDF as binder with organic solvent as dispersant. The cathode slurry is spread onto the surface of the cathode current collector by any means which can provide a substantially uniform coating layer thereon, such as doctor blade method, wired draw rod method, screen printing method or others. The solvent in the cathode slurry can be removed by evaporation under normal or low pressure and ambient or elevated temperature, the removal speed of solvent is preferably kept substantially constant along the surface of the slurry. Then, CR2032 coin battery is assembled with the obtained cathode, anode, electrolyte and a separator.

According to one aspect of the present invention, a series of methods for preparing the electrode composite material $AB_xC_yD_z$ is provided. Preparation methods are simple and easy to industrialization, while the electrode composite materials prepared thereby have excellent electrochemical properties that can be used in the electrochemical devices, such as battery.

Three methods for preparing the electrode composite material $AB_xC_yD_z$ are provided, wherein y=0, z=0.

Method 1

A method for preparing an electrode composite material comprising element sulfur, at least one of polypyrrole, polyacrylonitrile and polyacrylonitrile copolymer, comprises the following steps.

Sulfur and at least one of polypyrrole, polyacrylonitrile and polyacrylonitrile copolymer are mixed, the resultant is heat-treated in an inert gas or a vacuum atmosphere, the temperature range of heat-treatment is 250-350° C., the duration of heat-treatment is no less than 1 h, then the electrode composite material is obtained.

The weight ratio of sulfur in the electrode composite material is 70-80%, more specifically, the weight ratio of sulfur and at least one of PAN and PAN copolymer is 4:1.

The inert gas is selected from Ar or $N_2$. In an embodiment, the electrode composite material is heat-treated in Ar gas.

Specifically, sulfur and at least one of PAN and PAN copolymer are manually mixed; the duration of manual mixing is 1-30 minutes, preferably, 2-3 minutes.

Specifically, the resultant is heat-treated at 300° C. for 3 h.

Traditional method for preparing sulfur based electrode composite material includes mechanical mixing, such as ball milling which is time/energy consuming and may affect the structure of electrode composite material, especially material with polymer, for the long chain structure of the polymer could break. The mechanical mixing process is skipped from the method provided in the present invention for preparing the electrode composite material. The method is easy to operate and prevent the electrode composite material from adverse effect.

The electrode composite material prepared by the method disclosed in the present invention could be used as a cathode material, further, may be used for preparing battery with cathode containing the electrode composite material.

The method provided in the present invention for preparing the electrode composite material is simple, suitable for industrialization and without adverse influence in respect of material structure and property. The electrode composite material obtained by the method in the present invention exhibits excellent electrochemical properties, which greatly accelerate the commercialization of the battery.

Method 2

A method for preparing an electrode composite material comprising element sulfur and polyacrylonitrile, comprises the following steps.

Sulfur and polyacrylonitrile are mechanically mixed, then dried in a vacuum atmosphere, the resultant is heat-treated in an inert gas or a vacuum atmosphere, the temperature range of heat-treatment is 250-350° C., the duration of heat-treatment is 0.5-4 h, then the electrode composite material is obtained.

The mechanical mixing is conducted by ball milling. The vacuum drying temperature is 50-80° C. for 1-3 h.

More specifically, S and PAN are mixed in weight ratio of S/PAN=4:1 by ball-milling for 5 h with ethanol as dispersant. The resulted mixtures are dried at 50° C. for 3 h in vacuum oven and then annealed at 300° C. for 0.5-4 h. Preferably, the annealing time is 2.5 h.

The electrode composite material obtained by the method in the present invention exhibits excellent electrochemical property and thermal stability, and the method is simple and suitable for industrialization.

Method 3

A method for preparing an electrode composite material comprising element sulfur and polypyrrole, comprises the following steps.

Sulfur and polypyrrole are mechanically mixed, and then the electrode composite material is obtained.

Sulfur has a nano or micro particles. According to an embodiment, the average particle size of the sulfur is 150 micron. Polypyrrole has a branched nanostructure with diameter distribution range of 25-150 nm.

PPy and sulfur are mixed by ball milling, specifically, PPy is mixed with S in the weight ratio PPy:S=1:2 by ball-milling for 1-6 h at 200-1200 rpm. According to an embodiment, PPy is mixed with S by ball-milling for 3 h at 600 rpm.

Polypyrrole is synthesized as described below: pyrrole monomer is added into the cetyltrimethylammonium bromide (CTAB) solution, and stirred. Subsequently, aqueous solution of ammonium persulfate (Sigma-Aldrich, 98% purity) is added, and the solution is stirred for 12-24 h. All synthesis procedures are carried out in a temperature range between 0-5° C. The final precipitate of PPy is separated via filtration, thoroughly washed and then dried.

Specifically, pyrrole monomer is added into an aqueous solution with cationic surfactant CTAB and vigorously stirred to make the pyrrole monomer dissolved. Subsequently, ammonium persulfate is added, as an oxidizing agent, to initiate the polymerization, and the solution is stirred for 24 h. The final precipitate of PPy is separated via filtration, thoroughly washed with deionized water and ethanol for high purity of PPy.

The resulted PPy is dried after being washed. Specifically, PPy is dried in a vacuum atmosphere at 50-100° C. According to an embodiment, the drying temperature is 70° C. for 12-24 h, 12 h is preferable.

Though element sulfur has a high theoretical capacity, sulfur is an electron and ion insulator at room temperature, lithium-sulfur battery containing 100% content sulfur as cathode is impossible charged and discharged at room temperature. PPy with excellent conductivity is wildly used in the surface modification of electrode and as electrode materials. The electrode composite material S/PPy is prepared via the method provided in the present invention has excellent electrochemical performance. Branched conductive PPy matrix with nanostructure is uniformly coated with S, which enhance the conductivity of PPy/S. Furthermore, the branched structure of the nanocomposite and high porosity of the PPy matrix could hinder the polysulfide dissolution and improve the utilization of S.

The method provided in the present invention is simple and heat-treatment is exclusive to avoid the sulfur loss. Thus, the method disclosed in the present invention for preparing the electrode composite S/PPy is suitable for industrial application in the battery containing the electrode composites.

The electrode composite S/PPy is prepared by a simple one-step ball-milling without heat-treatment. This method is economical, environmentally friendly, for the exclusion of the heat treatment process may reduce the loss of sulfur and avoid the generation of harmful sulphide. The electrochemical performance is significantly enhanced of battery composed of this composite S/PPy and a liquid electrolyte, which is equal to that composed of sulfur based cathode containing expensive carbon materials prepared by complex process. Accordingly, the method provided in the present invention for preparing lithium ion battery with high performance sulfur based cathode has promising prospect.

Two methods for preparing the electrode composite material $AB_xC_yD_z$ are provided, wherein y=0, 0<z<1.

Method 1

A method for preparing an electrode composite material comprises the following steps.

disperse sulfur in a first solvent to get a first solution; add at least one of polypyrrole, polyacrylonitrile and polyacrylonitrile copolymer into a second solvent to get a second solution; mix the first solution, the second solution, and at least one of metal oxides by ball milling in inert atmosphere to get a mixture; dry the mixture to remove the solvents therein; then, the mixture is heat-treated in a protective gas, and cooled naturally. Then, the electrode composite material is obtained; the first solvent is selected from one of carbon disulfide, toluene and liquid hydrocarbon; the second solvent is selected from one of dimethylformamide, dimethyl acrylamide, a mixture containing dimethyl acrylamide and lithium chloride, and dimethyl sulfoxide.

The first solution, the second solution, and at least one of metal oxides are mixed uniformly by ball milling at 200-1300 rpm for 1-20 h. The ball milling is conducted in an inert gas to avoid side reaction.

Specifically, the metal oxides comprise $Mg_aNi_bO$, wherein, 0<a<1, 0<b<1, a+b=1. According to an embodiment, the metal oxide is $Mg_{0.6}Ni_{0.4}O$.

After being dried, the mixture is further heat treated at 150-450° C. for 1-20 h. The protective gas comprises Ar, $N_2$, a reductive gas mixture of Ar and $H_2$, and a reductive gas mixture of $N_2$ and $H_2$.

According to one aspect of this method, S is dissolved in the organic solvent of $CS_2$, and then mixed with DMF solution of PAN and $Mg_{0.6}Ni_{0.4}O$ by ball milling in Ar gas. All mixtures (precursors) are dried in a vacuum oven to remove the solvents and then heat treated, and then cooled to get the electrode composite material.

Method 2

A method for preparing an electrode composite material comprises the following steps.

Mix sulfur, at least one of polypyrrole, polyacrylonitrile and polyacrylonitrile copolymer, and at least one of metal oxides in solvent to get a first mixture, ball mill the first mixture to get a second mixture, vacuum dry the second mixture, and then heat-treat in a protective gas or vacuum atmosphere, cool to get the electrode composite material.

Preferably, the weight ratio range of sulfur in precursors is 60-95%, while polymer of polypyrrole, polyacrylonitrile, polyacrylonitrile copolymer, or a combination thereof is 2-40%, and the metal oxide is 0-20%. The solvent comprises but not limited to ethanol or N-methyl-2-pyrrolidone (NMP).

According to a specific embodiment, metal oxide comprises $Mg_{0.6}Ni_{0.4}O$, or $Mg_{0.8}Cu_{0.2}O$. Preferably, metal oxide is a mixture of MgO and NiO, or a mixture of MgO and CuO.

The ball milling is carried out at rotation speed of 200-1300 rpm for 1-20 h.

In the process of drying, the temperature range is 150-450° C. for no less than 1 h. Preferably, the temperature range is 250-400° C. for 1-20 h. The drying is carried out in a protective gas or vacuum atmosphere. The protective gas comprises Ar or $N_2$.

According to an aspect of this method, sulfur, PAN and $Mg_{0.6}Ni_{0.4}O$ are dissolved in ethanol as dispersant to get a first mixture, and then ball milled to get a second mixture. The second mixture is vacuum dried and heat treated at 300° C. for 3 h, then cooled to get the electrode composite material $PAN/S/Mg_{0.6}Ni_{0.4}O$.

Two methods for preparing the electrode composite material $AB_xC_yD_z$ are provided, wherein $0<y<1$, $0<z<1$.

Method 1

A method for preparing an electrode composite material comprises the following steps.

disperse sulfur in a first solvent to get a first solution; soak a carbon based material into the first solution and vacuum dry to remove the solvent therein to get a first mixture; mix the first mixture, at least one of metal oxides, at least one of polypyrrole, polyacrylonitrile and polyacrylonitrile copolymer by ball milling in an inert atmosphere to get a second mixture; vacuum dry the second mixture to remove the solvents therein; heat-treat the second mixture in a protective gas and then cool to get the electrode composite material; the first solvent is selected from one of carbon disulfide, toluene and liquid hydrocarbon.

The first mixture, at least one of metal oxides, at least one of polypyrrole, polyacrylonitrile, and polyacrylonitrile copolymer are uniformly mixed by ball milling at 200-1300 rpm for 1-20 h. The ball milling is conducted in an inert gas to avoid the side reaction.

The metal oxide comprises $Mg_aNi_bO$, wherein $0<a<1$, $0<b<1$, $a+b=1$. Specifically, the metal oxide is $Mg_{0.6}Ni_{0.4}O$.

The second mixture is vacuum dried at 35-75° C. for 3-12 h.

After being vacuum dried, the second mixture is further heat treated at 150-450° C. for 1-20 h. The protective gas comprises Ar, $N_2$, a reductive gas mixture of Ar and $H_2$, or a reductive gas mixture of $N_2$ and $H_2$.

According to one aspect of this method, sulfur is dissolved in organic solvent $CS_2$ with KB, then vacuum dried to remove the solvent $CS_2$ to get the first mixture. Then the first mixture, PAN and $Mg_{0.6}Ni_{0.4}O$ are mixed by ball milling in Ar gas, the resultant is vacuum dried to remove the solvent, and then heat treated in $N_2$ gas. After cooling the electrode composite material is obtained.

Method 2

A method for preparing an electrode composite material comprises the following steps.

disperse sulfur in a first solvent to get a first solution; soak a carbon based material into the first solution and vacuum dry to remove the solvent therein to get a first mixture; add at least one of polypyrrole, polyacrylonitrile and polyacrylonitrile copolymer into a second solvent to get a second solution; mix at least one of metal oxides, the first mixture, the second solution by ball milling in an inert atmosphere to get a second mixture; dry the second mixture to remove the solvents therein; heat-treat the second mixture in a protection gas, then cool to get the electrode composite material; the first solvent is selected from one of carbon disulfide, toluene, and liquid hydrocarbon; the second solvent is selected from one of dimethylformamide, dimethyl acrylamide, a mixture of dimethyl acrylamide and lithium chloride and dimethyl sulfoxide.

The first mixture, at least one of metal oxides and the second solution are uniformly mixed by ball milling at 200-1300 rpm for 1-20 h. The ball milling is conducted in an inert gas to avoid the side reaction.

The metal oxide comprises $Mg_aNi_bO$, wherein $0<a<1$, $0<b<1$, $a+b=1$. Specifically, metal oxide is $Mg_{0.6}Ni_{0.4}O$.

The second mixture is vacuum dried at 35-75° C. for 3-12 h.

After being vacuum dried, the second mixture is further heat-treated at 150-450° C. for 1-20 h. The protective gas comprises Ar, $N_2$, a reductive gas mixture of Ar and $H_2$, and a reductive gas mixture of $N_2$ and $H_2$.

According to one aspect of this method, sulfur is dissolved in the organic solvent $CS_2$ with KB, then vacuum dried to remove the solvent $CS_2$ to get the first mixture, and then mixed with DMF solution of PAN and $Mg_{0.6}Ni_{0.4}O$ by ball milling in Ar gas, the resultant is vacuum dried to remove the solvent, and then heat treated. After being cooled, the electrode composite material is obtained.

The methods provided in the present invention for preparing an electrode composite material comprise solution method, mechanical ball milling, drying and heat treatment, so that each component of the electrode composite material can be more uniformly dispersed with smaller size, while the particle size of the electrode composite material is also smaller.

Aspects of the present invention are described below by means of various illustrative examples.

EXAMPLES

Example 1

4 g S is dissolved in 30 $cm^3$ of $CS_2$, then is mixed with the PAN solution in dimethyl formamide (DMF) and dried in a vacuum oven at 65° C. for 3 h to remove the solvents and then heat treated at 350° C. for 3 h in a tubular furnace in Ar gas to make sulfur melt and react with PAN, then cooled to prepare the binary S/PAN composite. During the preparation process, the weight ratio of composite precursors (before heat treatment) is S:PAN=4:1.

FIG. 1 shows the XRD spectra of sulfur, KB and the composite PAN/S/KB prepared via mechanical and solution routes. It can be seen that the characteristic peaks of sulfur disappear in the composite S/KB and PAN/S/KB, and sublimed sulfur precipitates in highly crystallized form when cooled to the ambient temperature, which can be an indication of that element sulfur in melting state can be trapped into the carbon based grid and pores of PAN, and partially participate in bonding reaction to form sulfur based composite. The samples are weighted before and after heat treatment, which shows about 10 wt. % loss of sulfur during heating.

Figure 2:
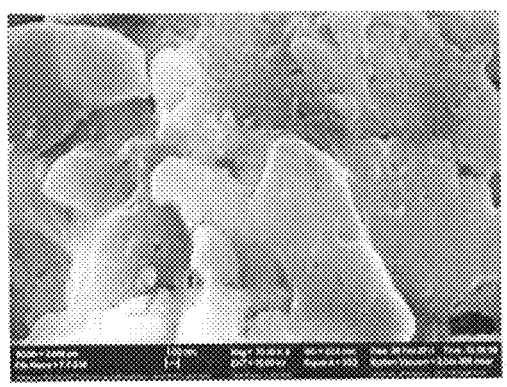
FIG. 2 shows the SEM image of the composite material PAN/S.

FIG. 2 shows the SEM image of the prepared binary composite PAN/S. One can see that the binary composite PAN/S has a smooth surface, due to element sulfur in melting state can being trapped into the carbon based grid and pores of PAN, and partially participating in bonding reaction to form sulfur based composite.

Example 2

4 g S is dissolved in 30 cm$^3$ of CS$_2$, then is mixed with the PAN solution in DMF by ball milling at 800 rpm for 2 h with Mg$_{0.6}$Ni$_{0.4}$O, and dried in a vacuum oven at 65° C. for 3 h to remove the solvents and then heat treated at 350° C. for 3 h in a tubular furnace in Ar gas, then cooled to prepare the ternary composite PAN/S/Mg$_{0.6}$Ni$_{0.4}$O. During the preparation process, the weight ratio of composite precursors (before heat treatment) is S:PAN:Mg$_{0.6}$Ni$_{0.4}$O=4:1:0.3.

Figure 3:
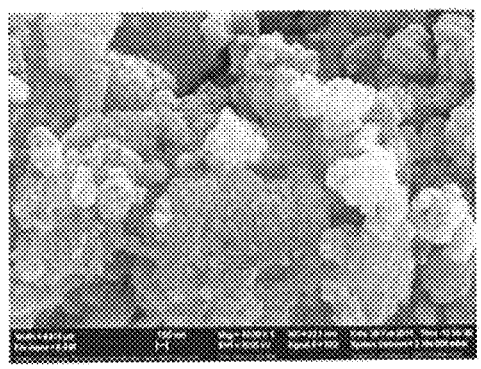
FIG. 3 shows the SEM image of the composite material PAN/S/$Mg_{0.6}Ni_{0.4}O$.

FIG. 3 shows the SEM image of the prepared ternary composite PAN/S/Mg$_{0.6}$Ni$_{0.4}$O. One can see that the surface morphology of the binary composite PAN/S is quite different from that of the ternary composite PAN/S/Mg$_{0.6}$Ni$_{0.4}$O. The ternary composite PAN/S/Mg$_{0.6}$Ni$_{0.4}$O surface is rough and consists of many agglomerated nanosized particles, which could enhance the materials reactivity via increasing the available reactive surface area of the composite. Also, this morphology change could be due to the formation of the surface layer of Mg$_{0.6}$Ni$_{0.4}$O, which could stabilize the material surface and consequently enhance the electrochemical stability of the ternary composite PAN/S/Mg$_{0.6}$Ni$_{0.4}$O.

Example 3

4 g S is dissolved in 30 cm$^3$ of CS$_2$ with KB, and dried in a vacuum oven to remove the solvent CS$_2$, then mixture of S/KB is obtained. PAN is dissolved in DMF, then is mixed with the mixture of S/KB by ball milling at 800 rpm for 2 h with Mg$_{0.6}$Ni$_{0.4}$O, and dried in a vacuum oven at 65° C. for 3 h to remove the solvents and then heat treated at 350° C. for 3 h in a tubular furnace in Ar gas, then cooled to prepare the quaternary composite PAN/S/KB/Mg$_{0.6}$Ni$_{0.4}$O. During the preparation process, the weight ratio of composite precursors (before heat treatment) is S:PAN:KB:Mg$_{0.6}$Ni$_{0.4}$O=4:1:0.25:0.25.

Figure 4:
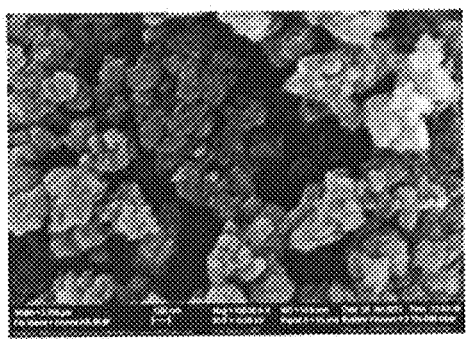
FIG. 4 shows the SEM images of the composite material PAN/S/KB/$Mg_{0.6}Ni_{0.4}O$.

FIG. 4 presents the SEM images of the quaternary composite PAN/S/KB/Mg$_{0.6}$Ni$_{0.4}$O. The addition of KB leads to the electronic conductivity improvement and prevents the agglomeration of the material during ball milling. One can see from FIG. 4 that the addition of KB into the sulfur-polymer composite leads to the reduced agglomeration of the quaternary composite nanoparticles compared with the ternary system. Therefore, along with the electronic conductivity enhancement, the addition of KB could favour the enhanced ionic conductivity of the quaternary composite as well due to the reduced lithium diffusion paths within the smaller particles of the cathode material.

Example 4

Sulfur polymer composite cathode is prepared by mixing 80 wt. % of S/PAN, composite as an active material, 10 wt. % ketjen black (KB) as a conductor, and 10 wt. % polyvinylidene fluoride (PVDF) as a binder dissolved in N-methyl-2-pyrrolidene (NMP) and coating the resulting slurry on a nickel foam using doctor blade technique. The composite cathode is dried thereafter at 50° C. for 24 h in a vacuum oven. After drying, the composite cathode was cut into circles. Coin-type batteries of CR2032 are assembled in an Ar-filled glove box by stacking a porous polypropylene separator containing 1 M LiPF$_6$ EC:DMC:DEC=1:1:1 (by volume) as liquid electrolyte between the cathode and lithium metal anode.

The battery is discharged and charged galvanostatically at the same current density between 1.0 V and 3.0 V vs. Li$^+$/Li at various C rates at room temperature.

Example 5

Sulfur polymer composite cathode is prepared by mixing 80 wt. % of PAN/S/Mg$_{0.6}$Ni$_{0.4}$O composite as an active material, 10 wt. % KB as a conductor, and 10 wt. % PVDF as a binder dissolved in NMP and coating the resulting slurry on a nickel foam using doctor blade technique. The composite cathode is dried thereafter at 50° C. for 24 h in a vacuum oven. After drying, the composite cathode was cut into circles. Coin-type batteries of CR2032 are assembled in an Ar-filled glove box by stacking a porous polypropylene separator containing 1 M LiPF$_6$ EC:DMC:DEC=1:1:1 (by volume) as liquid electrolyte between the cathode and lithium metal anode.

Figure 5:
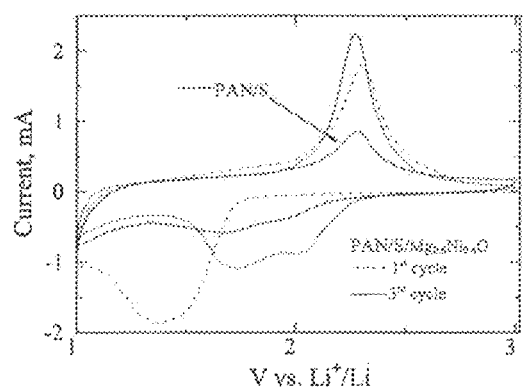
FIG. 5 shows the cyclic voltammetry curves of the batteries provided in example 4 and 5.

FIG. 5 shows the cyclic voltammetry curves of the batteries provided in example 4 and 5, respectively. It can be seen that the addition of Mg$_{0.6}$Ni$_{0.4}$O leads to the enhanced electrochemical response of the cathode material. The Mg$_{0.6}$Ni$_{0.4}$O added ternary composite PAN/S/Mg$_{0.6}$Ni$_{0.4}$O has 2 well-separated reduction peaks accompanied with an oxidation peak in the reverse scan in the CV curves. The corresponding peaks of the binary S/PAN composite are weaker and broader.

Figure 6:
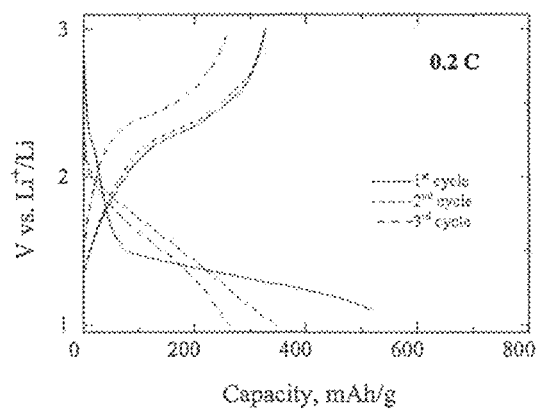
FIG. 6 shows the charge-discharge profiles of the battery containing S/PAN composite cathode at 0.2 C provided in example 4.
Figure 7:
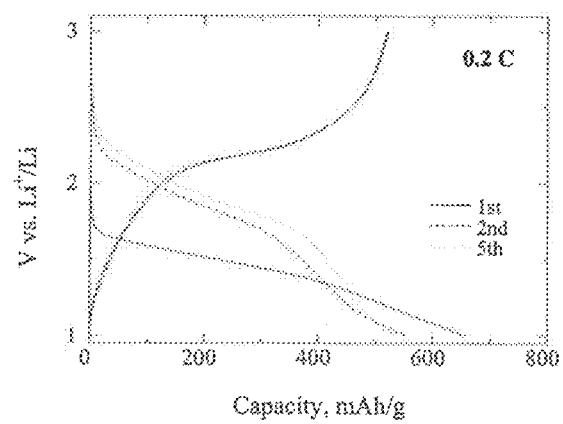
FIG. 7 shows the charge-discharge profiles of the battery containing PAN/S/$Mg_{0.6}Ni_{0.4}O$ composite cathode at 0.2 C provided in example 5.

FIGS. 6 and 7 show the charge-discharge profiles of battery at 0.2 C provided in example 4 and 5. It can be clearly seen that the kinetic improvement and the polarization decrease achieved in the system by the addition of Mg$_{0.6}$Ni$_{0.4}$O could be very beneficial for the utilization of low-conductive sulfur active material in the composite cathode and could play a remarkable role in the improvement of the energy and power density of the battery. The test result shows that the potential plateau of the ternary composite PAN/S/Mg$_{0.6}$Ni$_{0.4}$O becomes relatively flattened compared with that of the binary composite S/PAN, and the voltage gap between charge and discharge decreases, indicating improved electrochemical kinetics of the cathode with PAN/S/Mg$_{0.6}$Ni$_{0.4}$O. A specific capacity of 650 mAh/g of battery in example 5 is delivered in the first discharge, and a reversible capacity of 540 mAh/g is obtained in the second cycle.

Figure 8:
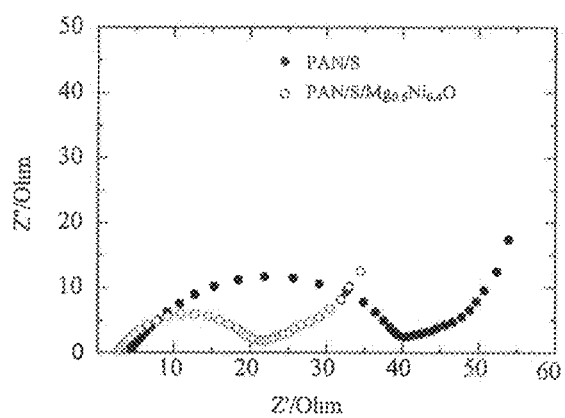
FIG. 8 shows the AC impedance plots of S/PAN composite provided in example 4 and PAN/S/$Mg_{0.6}Ni_{0.4}O$ composite provided in example 5.

FIG. 8 shows the AC impedance plots of a binary S/PAN and ternary PAN/S/Mg$_{0.6}$Ni$_{0.4}$O composites. The comparison of the AIS spectra of the composite cathodes shows that the impedance of ternary PAN/S/Mg$_{0.6}$Ni$_{0.4}$O composite is smaller than that of binary S/PAN.

Figure 9:
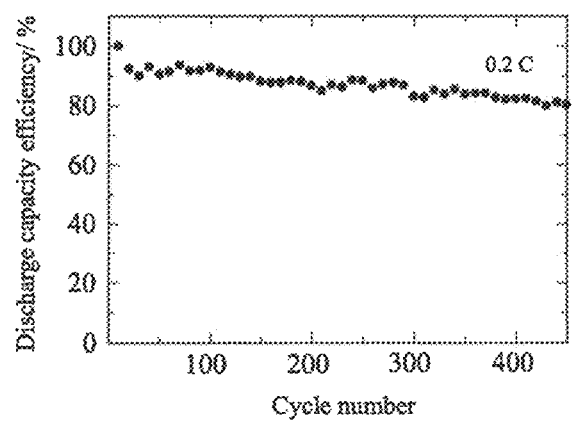
FIG. 9 shows the capacity retention data for the battery containing PAN/S/$Mg_{0.6}Ni_{0.4}O$ composite cathode at 0.2 C provided in example 5.

FIG. 9 shows the capacity retention data for the battery provided in example 5 with ternary PAN/S/Mg$_{0.6}$Ni$_{0.4}$O composite cathode at 0.2 C upon prolonged cycling. The capacity retention is high and remains above 80% of the initial capacity even after 450 cycles.

Example 6

A battery is made according to a method similar to that described in example 5. However, in this case, aluminum foil is used as cathode current collector.

Figure 10:
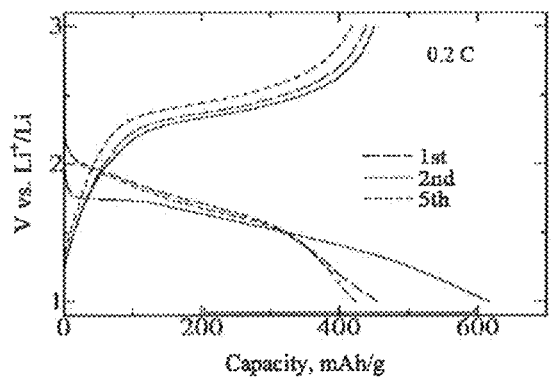
FIG. 10 shows the charge-discharge profiles of the battery at 0.2 C provided in example 6.

FIG. 10 shows the charge-discharge profiles of battery at 0.2 C provided in example 6. The test result shows that the potential plateau become relatively flattened compared with that of FIG. 7, and the voltage gap between charge and discharge decrease, indicating improved electrochemical performance of the cathode with PAN/S/Mg$_{0.6}$Ni$_{0.4}$O.

Example 7

A battery is made according to a method similar to that described in example 5. However, in this case, 1 M $LiPF_6$ EC:DMC:DEC=1:1:1 (by volume) soaked in polymer PVDF-HFP is used as electrolyte.

Example 8

A battery is made according to a method similar to that described in example 5. However, in this case, 1 M $LiPF_6$ EC:DMC:DEC=1:1:1 (by volume) soaked in polymer polyethylene glycol boric acid ester is used as electrolyte.

Example 9

Sulfur polymer composite cathode is prepared by mixing 80 wt. % of $PAN/S/KB/Mg_{0.6}Ni_{0.4}O$ composite as an active material, 10 wt. % KB as a conductor, and 10 wt. % PVDF as a binder dissolved in NMP and coating the resulting slurry on a nickel foam using doctor blade technique. The composite cathode is dried thereafter at 50° C. for 24 h in a vacuum oven. After drying, the composite cathode was cut into circles. Coin-type batteries of CR2032 are assembled in an Ar-filled glove box by stacking a porous polypropylene separator containing 1 M $LiPF_6$ EC:DMC:DEC=1:1:1 (by volume) as liquid electrolyte between the cathode and lithium metal anode.

Figure 11:
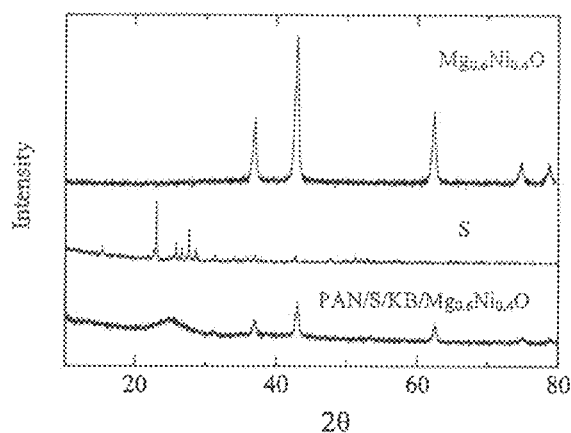
FIG. 11 shows the XRD spectra of the starting components S, $Mg_{0.6}Ni_{0.4}O$, and PAN/S/KB/$Mg_{0.6}Ni_{0.4}O$ composite.

FIG. 11 shows the XRD spectra of the starting components S, $Mg_{0.6}Ni_{0.4}O$, $PAN/S/KB/Mg_{0.6}Ni_{0.4}O$. It can be seen from FIG. 11 that the peaks of $Mg_{0.6}Ni_{0.4}O$ remain in the composite $PAN/S/KB/Mg_{0.6}Ni_{0.4}O$, which could be considered as an indication that $Mg_{0.6}Ni_{0.4}O$ is kept in the composite cathode without remarkable structural changes.

Figure 12:
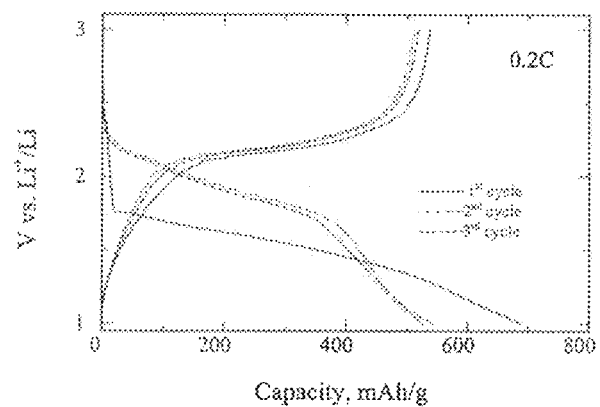
FIG. 12 shows the galvanostatic charge-discharge profiles of the battery containing PAN/S/KB/$Mg_{0.6}Ni_{0.4}O$ composite cathode at 0.2 C provided in example 9.

FIG. 12 presents the galvanostatic charge-discharge profiles of the battery with quaternary $PAN/S/KB/Mg_{0.6}Ni_{0.4}O$ composite cathode at 0.2 C. It can be seen that the potential plateau becomes relatively flattened compared with that of FIG. 7, and the voltage gap between charge and discharge decreases; the addition of $Mg_{0.4}Ni_{0.6}O$ leads to the improvement of cathode conductivity and the reduction of electrode polarization; besides, the particle sizes of the KB-added composite compared with the $S/PAN/Mg_{0.6}Ni_{0.4}O$ composite are remarkably reduced, due to the improved electronic conductivity of the cathode and the agglomeration reduction effect of KB, which shorten the diffusion path of Lithium ion and make the battery charged faster.

Figure 13:
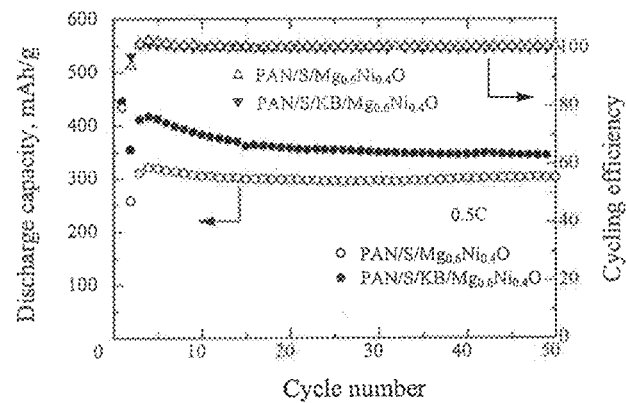
FIG. 13 shows cyclability data along with the cycling efficiency at 0.5 C for batteries containing PAN/S/KB/$Mg_{0.6}Ni_{0.4}O$ composite provided in example 5 and PAN/S/$Mg_{0.6}Ni_{0.4}O$ composite provided in example 9.

FIG. 13 shows cyclability data along with the cycling efficiency at 0.5 C for batteries with $PAN/S/KB/Mg_{0.6}Ni_{0.4}O$ and $PAN/S/Mg_{0.6}Ni_{0.4}O$ composites respectively. It can be seen that both cathodes exhibit excellent cycling efficiency, and the KB added composites $PAN/S/KB/Mg_{0.6}Ni_{0.4}O$ shows improved discharge capacity compared with the ternary composite $PAN/S/Mg_{0.6}Ni_{0.4}O$.

Figure 14:
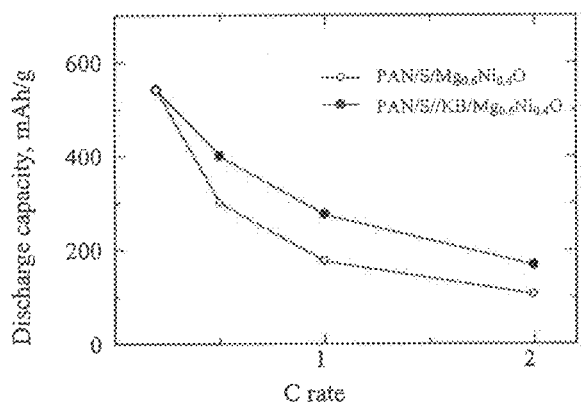
FIG. 14 shows the rate capability data for the batteries containing PAN/S/KB/$Mg_{0.6}Ni_{0.4}O$ composite provided in example 5 and PAN/S/$Mg_{0.6}Ni_{0.4}O$ composite provided in example 9.

FIG. 14 shows the rate capability data for batteries with $PAN/S/KB/Mg_{0.6}Ni_{0.4}O$ and $PAN/S/Mg_{0.6}Ni_{0.4}O$ composites respectively. It can be seen that the discharge capacity of battery with $PAN/S/KB/Mg_{0.6}Ni_{0.4}O$ composite cathode is more than that of battery with $PAN/S/Mg_{0.6}Ni_{0.4}O$ composite cathode, which can be an indication that the electrochemical performance of composite cathode could be remarkably improved by the addition of KB. Battery with $PAN/S/KB/Mg_{0.6}Ni_{0.4}O$ composite cathode delivers a stabilized discharge capacity of about 410 mAh/g compared with 320 mAh/g of the battery with ternary $PAN/S/Mg_{0.6}Ni_{0.4}O$ cathode with about 100% capacity retention over 40 cycles at 0.5 C galvanostatic charge-discharge.

Example 10

A battery is made according to a method similar to that described in example 9. However, in this case, aluminum foil is used as cathode current collector.

Example 11

A battery is made according to a method similar to that described in example 9. However, in this case, 1 M $LiPF_6$ EC:DMC:DEC=1:1:1 (by volume) soaked in polymer PVDF-HFP is used as electrolyte.

Figure 15:
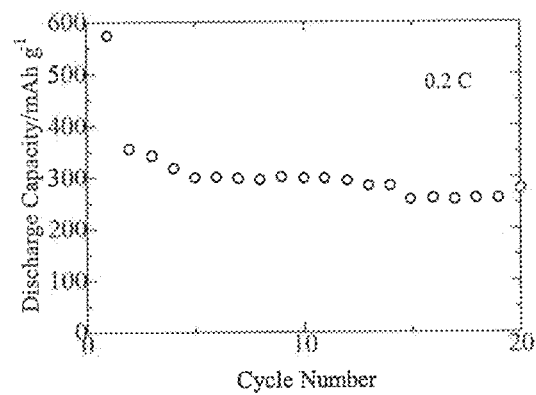
FIG. 15 shows the capacity retention data for the battery at 0.2 C provided in example 11.

FIG. 15 shows the capacity retention data for the battery provided in example 11 at 0.2 C. It can be seen that the fading of capacity of battery is relatively slow after two cycles, and the discharge capacity is recovered at $20^{th}$ cycles.

Example 12

A battery is made according to a method similar to that described in example 9. However, in this case, 1 M $LiPF_6$ EC:DMC:DEC=1:1:1 (by volume) soaked in polymer polyethylene glycol boric acid ester is used as electrolyte.

Example 13

Element S, PAN and $Mg_{0.6}Ni_{0.4}O$ are mixed in weight ratio of $S/PAN/Mg_{0.6}Ni_{0.4}O$=4:1:0.25 by ball-milling for 5 h with ethanol as dispersant. The resulted mixtures are dried at 50° C. for 3 h in vacuum oven and then annealed at 300° C. for 3 h in Ar atmosphere. Finally, ternary $PAN/S/Mg_{0.6}Ni_{0.4}O$ composite is obtained.

S based cathode is prepared by making slurry of 80 wt. % $PAN/S/Mg_{0.6}Ni_{0.4}O$ as an active material, 10 wt. % ketjen black as a conductor and 10 wt. % polyvinylidene fluoride (PVDF) binder in NMP. The resulted slurry is spread onto a nickel foam and vacuum dried at 50° C. for 12 h, then pressed using a rolling machine to get the cathode plate. Separator used here is a porous polypropylene membrane. 1 M LiPF6 in a solution of ethylene carbonate (EC):dimethyl carbonate (DMC):diethylene carbonate (DEC) (EC:DMC:DEC volume ratio=1:1:1) is used as a liquid electrolyte. The CR2032 coin battery is assembled in a gloved box filled with high purity Ar.

Example 14

A battery is made according to a method similar to that described in example 13. However, in this case, $Mg_{0.8}Cu_{0.2}O$ is used instead of $Mg_{0.6}Ni_{0.4}O$ to prepare ternary $PAN/S/Mg_{0.8}Cu_{0.2}O$ composite and CR2032 coin battery with ternary $PAN/S/Mg_{0.8}Cu_{0.2}O$ composite cathode.

Example 15

A battery is made according to a method similar to that described in example 13. However, in this case, mixture of MgO and NiO is used instead of $Mg_{0.6}Ni_{0.4}O$ to prepare ternary PAN/S/MgO+NiO composite and CR2032 coin battery with ternary PAN/S/MgO+NiO composite cathode. The weight ratio of MgO and NiO is 6:4.

Example 16

A battery is made according to a method similar to that described in example 13. However, in this case, mixture of MgO and CuO is used instead of $Mg_{0.6}Ni_{0.4}O$ to prepare ternary PAN/S/MgO+CuO composite and CR2032 coin battery with ternary PAN/S/MgO+CuO composite cathode. The weight ratio of MgO and CuO is 8:2.

Example 17

A battery is made according to a method similar to that described in example 13. However, in this case, MgO is used instead of $Mg_{0.6}Ni_{0.4}O$ to prepare ternary PAN/S/MgO composite and CR2032 coin battery with ternary PAN/S/MgO composite cathode.

Example 18

A battery is made according to a method similar to that described in example 13. However, in this case, NiO is used instead of $Mg_{0.6}Ni_{0.4}O$ to prepare ternary PAN/S/NiO composite and CR2032 coin battery with ternary PAN/S/NiO composite cathode.

Example 19

A battery is made according to a method similar to that described in example 13. However, in this case, CuO is used instead of $Mg_{0.6}Ni_{0.4}O$ to prepare ternary PAN/S/CuO composite and CR2032 coin battery with ternary PAN/S/CuO composite cathode.

Then, the batteries in example 13-19 are tested.

The batteries are charged and discharged galvanostatically at 0.2 C (1 C=1672 mAh/g) between 1 and 3 V at room temperature. Specific capacities and current densities are calculated based on the amount of S in cathode, which could be identified by using an elemental analyzer.

The electrochemical performance of batteries is presented in table 1.

The coulombic efficiency of batteries in example 13-19 is nearly 100% after 35 cycles. Battery in example 13 shows the best discharge capacity and discharge capacity retention. The equivalent electrochemical performances of batteries in example 14-17 indicate that the addition of MgO is the main reason for improvement of cyclability. Of the batteries in example 17-19, the battery in example 17 shows the best electrochemical performance. Batteries in example 13 and 15 show the equivalent performance, so do the batteries in example 14 and 16, which can be the indication that the effect of mixture of MgO and NiO is equal to $Mg_{0.6}Ni_{0.4}O$ and MgO and CuO is equal to $Mg_{0.8}Cu_{0.2}O$. Nevertheless, the method of preparing the mixture of MgO/NiO and MgO/CuO is more simple and economic than that of $Mg_{0.6}Ni_{0.4}O$ and $Mg_{0.8}Cu_{0.2}O$.

Example 20

12.4 g cetyltrimethylammonium bromide (CTAB) (Sigma, 99.9% purity) is dissolved in 0.75 L deionized water, and then 0.015 L of pyrrole monomer (Aldrich, 98% purity) is added into the CTAB solution, stirred for 3 h. Subsequently, 0.045 L aqueous solution of 5.1 g ammonium persulfate (Sigma-Aldrich, 98% purity) is added, as an oxidizing agent, to initiate the polymerization, and the solution is stirred for 24 h. All synthesis procedures are carried out in a temperature range between 0-5 V. The final precipitate of PPy is separated via filtration, thoroughly washed with deionized water and ethanol, and then vacuum dried at 70 V for 12 h. To make PPy/S composite, PPy is mixed with S (Sigma-Aldrich, 100-mesh particle size powder) in the weight ratio PPy:S=1:2, by ball-milling for 3 h at 600 rpm.

Figure 16:
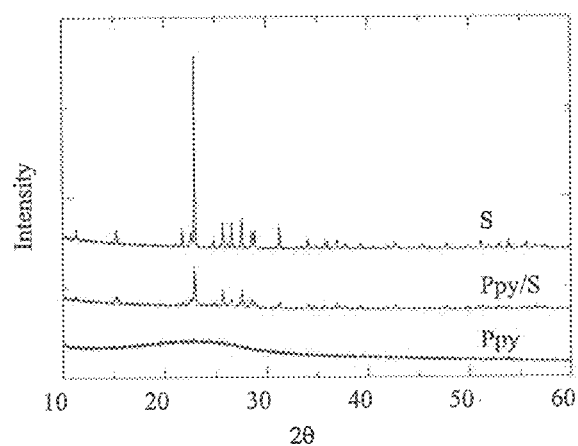
FIG. 16 shows the XRD patterns of pure S, pure PPy and PPy/S composite.

The XRD patterns of pure S, pure PPy and PPy/S composite are shown in FIG. 16. One can see that while PPy is amorphous. In comparison with S, the PPy/S composite shows sharp peaks of S with reduced peak intensity. On the other hand, no peak shift could be observed, which could be an indication of the absence of phase transformations due to ball milling, and the sulfur crystal structure remains in the PPy/S composite. However, the XRD peak intensity reduction may indicate partial absorption of melted sulfur, during ball-milling, into the porous structure of PPy, since ball-milling generates heat and the temperature increases over the melting point of sulfur. Chemical analysis has shown that the sulfur content in the PPy/S composite is about 65 wt %, i.e. there is no significant sulfur loss when the composite is prepared by the method in the present invention.

Figure 17:
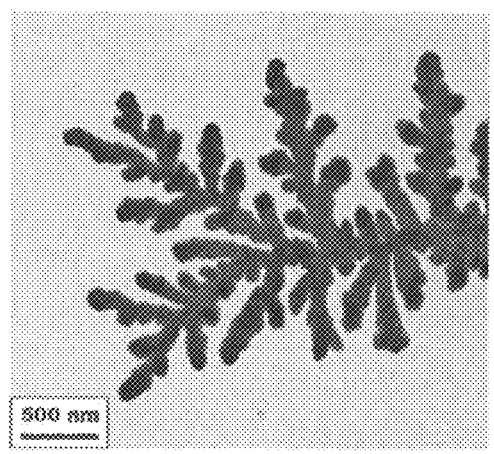
FIG. 17 shows the TEM data of PPy/S composite.

The TEM data of PPy/S composite is presented in FIG. 17 which shows that the PPy/S composite has a well-developed branched structure.

Specific surface area of the as-prepared PPy is 129.8 m²/g with the pore volume of 0.55 cm³/g. After mixing with sulfur, the specific surface area of PPy/S is only 4.4 m²/g with the pore volume of 0.052 cm³/g. This remarkable specific surface area and pore size reduction of PPy/S composite could be mainly due to deposition of a large amount of sulfur into the pores and surface of PPy. The formation of the PPy/S composite with homogeneous sulfur deposition on the conductive PPy surface may drastically improve the conductivity of the composite cathode, which is important for the sulfur utilization and increase of the sulfur cathode capacity. Furthermore, the branched nanostructure of PPy/S could accommodate the volume change of the composite during charge and discharge and improve the cyclability of the composite cathode.

A high S content cathode is desirable to construct a high energy density battery. Exclusion of the heat treatment from

TABLE 1

| | Cathode active material | Anode | Electrolyte | Voltage | Discharge capacity (mAh/g) | Discharge capacity retention (%) | Coulombic efficiency (%) |
|---|---|---|---|---|---|---|---|
| Example 13 | PAN/S/$Mg_{0.6}Ni_{0.4}O$ | Li | $LiPF_6$ EC/DEC/DMC | 1-3 V | 1250 | 96 | ~100 |
| Example 14 | PAN/S/$Mg_{0.8}Cu_{0.2}O$ | | | | 1125 | 88 | |
| Example 15 | PAN/S/MgO + NiO | | | | 1100 | 92 | |
| Example 16 | PAN/S/MgO + CuO | | | | 1150 | 86.7 | |
| Example 17 | PAN/S/MgO | | | | 1104 | 95 | |
| Example 18 | PAN/S/NiO | | | | 1026 | 85.6 | |
| Example 19 | PAN/S/CuO | | | | 1058 | 82.2 | | the synthetic route for the PPy/S composite along with saving energy and simplifying the preparation process prevents the sulfur loss due to its sublimation. This also prevents the generation of toxic volatile sulfur compounds at high temperature conditions; therefore, the preparation technique provided in the present invention could be more preferable than the conventional prolonged multi-step and high temperature techniques for preparation of conductive S-containing composites.

Example 21

The electrochemical performance of PPy/S composite samples is investigated using coin-type batteries (CR2032).

The composite cathode slurry is prepared by mixing 80 wt % PPy/S, 10 wt % PVdF (Kynar, HSV900) as a binder and 10 wt % acetylene black (MTI, 99.5% purity) conducting agent in NMP (Sigma-Aldrich, ≥99.5% purity). The resultant slurry in NMP is spread onto a circular piece of nickel foam (MTI, ≥99% purity) with 1 cm in diameter. After drying in a vacuum oven for 12 h at 60 V, the cathode is pressed at 8 MPa by a hydraulic press in order to achieve good contact between the active material and nickel foam. The electrodes are prepared to make their weight and thickness the same by precise weighing, pressing and controlling its geometry.

The battery is composed of lithium metal anode and as prepared PPy/S cathode separated by a microporous polypropylene separator soaked in 1 mol/L solution of lithium bistrifluoromethanesulfonamide (LiTFSI) (Aldrich, 96% purity) in tetraethylene glycol dimethyl ether (Aldrich, 99% purity) electrolyte. The coin battery is assembled in a Braun glove box filled with high purity argon (99.9995% purity).

Comparative Example 1

A battery is made according to a method similar to that described in example 21. However, in this case, the cathode is prepared by mixing 60 wt % S, 30 wt % acetylene black (MTI, 99.5% purity) conducting agent and 10 wt % PVdF as a binder.

Comparative Example 2

A battery is made according to a method similar to that described in example 21. However, in this case, the cathode is prepared by mixing 60 wt % PPy, 30 wt % acetylene black (MTI, 99.5% purity) conducting agent and 10 wt % PVdF as a binder.

The electrochemical performance of batteries in example 21, comparative example 1 and 2 is tested.

The batteries are tested galvanostatically on a multichannel battery tester (BT-2000, Arbin Instruments) between 1 and 3 V vs. Li$^+$/Li electrode at a current density of 100 mA/g. Applied currents and specific capacities are calculated on the basis of the weight of S in the cathode.

Cyclic voltammetry (CV) and AC impedance spectroscopy (AIS) are performed with a potentiostat (VMP3, Biologic). CV is conducted between 1 and 3 V vs. Li$^+$/Li at a scanning rate of 0.1 mV/s. The frequency of AC impedance is varied from 1 MHz to 1 Hz with applied voltage amplitude of 10 mV. All electrochemical measurements are performed at room temperature.

Figure 18:
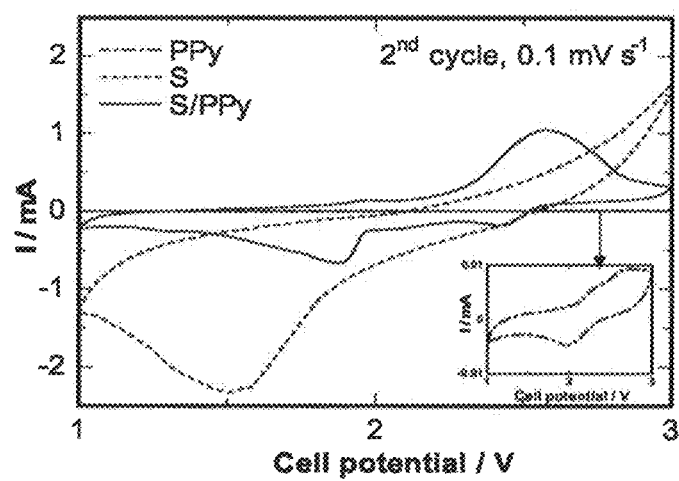
FIG. 18 shows the CV curves of the batteries containing PPy/S composite, S and PPy, used as a cathode active material in the lithium half-battery provided in example 21, comparative example 1 and 2.

The CV curves are shown in FIG. 18 for batteries with PPy/S, S and PPy composite, used as a cathode active material in the lithium half-battery provided in example 21, comparative example 1 and 2. One can see that for pure S cathode in comparative example 1, one broad reduction peak is observed at about 1.5 V vs. Li$^+$/Li, and the electrochemical processes are slow and poorly reversible. It can also be seen that battery with PPy composite cathode is electrochemically inactive at 1-3 V and there are no noticeable electrochemical processes observed. In the case of the battery with S/PPy composite cathode, two pairs of complex reversible redox peaks are observed around 2 and 2.5 V, which is possible due to the multi-step electrochemical reactions of S with Li$^+$. The CV data reveals that PPy improves the electrochemical kinetics of S.

Figure 19:
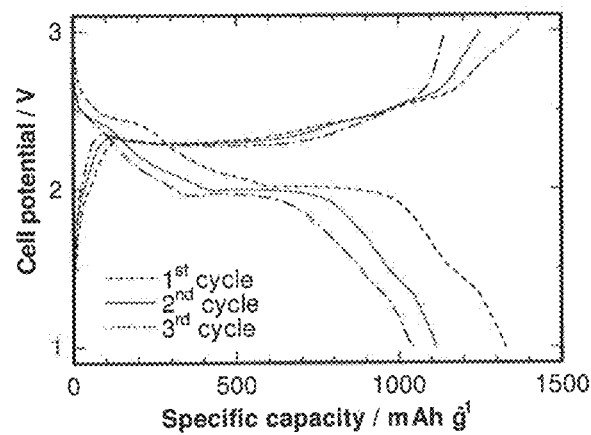
FIG. 19 shows the initial profiles of galvanostatic charge-discharge tests of the battery with PPy/S composite cathode provided in example 21.

The initial profiles of galvanostatic charge-discharge tests of the battery with PPy/S cathode provided in example 21 are shown in FIG. 19. It can be seen that two main plateaus appear in the potential profiles, which could be attributed to two main electrochemical reactions taking place at sulfur cathode upon cycling in Li/S battery. The results are in good agreement with the CV data. The first electrochemical reaction is presented by a short discharge plateau about 2.5 V and related to the formation of higher-order lithium polysulfides ($Li_2S_n$, n≥4), which are soluble in the liquid electrolyte. The following prolonged plateau around 2.0 V in the discharge profiles reflects the following electrochemical transition of the polysulfides to lithium sulfide $Li_2S$, and this reaction kinetics is slower than that of the polysulfide formation. It could be seen that while the 2 V discharge plateaus had no remarkable difference between the first and third cycles, the higher voltage plateau diminishes and almost disappears after the third cycle. Discharge capacity of 1050 mAh/g is obtained at the third cycle.

Figure 20:
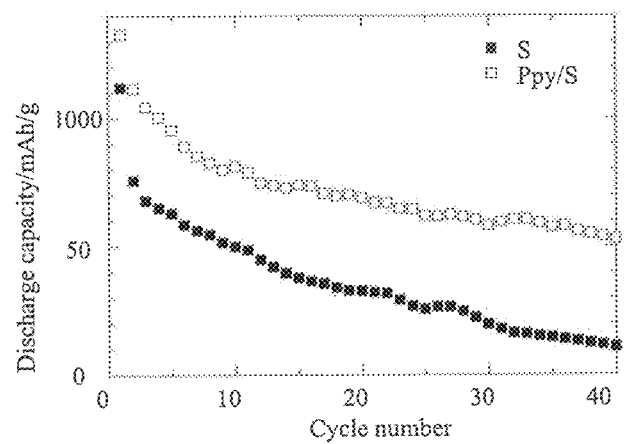
FIG. 20 shows the cyclability of batteries provided in example 21 and comparative example 1.

The cyclability of batteries provided in example 21 and comparative example 1 is showed in FIG. 20. It can be seen that the battery with PPy/S composite cathode cyclability is remarkably enhanced compared with that of the S cathode. The discharge capacity of battery in example 21 has been stabilized after 25 cycles at about 600 mAh/g and a discharge capacity of 500 mAh/g is retained after 40 cycles. In contrast, the discharge capacity of battery in comparative example 1 drastically decreased with cycling. The battery with pure sulfur cathode has a discharge capacity of only about 110 mAh/g at the 40th cycle.

Figure 21:
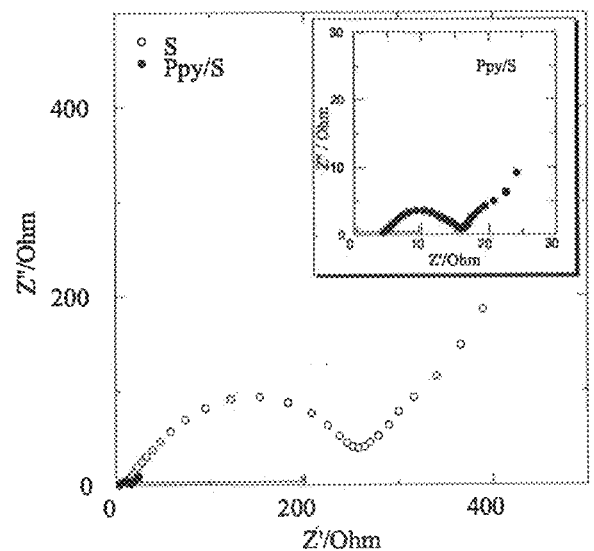
FIG. 21 shows AC impedance behavior of the batteries containing S and PPy/S cathode provided in example 21 and comparative example 1.

AC impedance behavior of the batteries with S and PPy/S cathode provided in example 21 and comparative example 1 is given in FIG. 21. A much smaller high-to-medium frequency semicircle can be seen in the PPy/S cathode AIS spectra compared with that of the sulfur cathode in comparative example 1. This indicates a significant decrease in charge transfer resistance in the PPy/S composite, which may be due to the high conductivity polypyrrole. This charge transfer enhancement leads to the electrochemical performance improvement of the composite cathode.

Example 22

Sulfur (Sigma-Aldrich, 100-mesh particle size powder), polyacrylonitrile (PAN) (Sigma-Aldrich) are mixed by hand for 2-3 minutes in the weight ratio of 4:1. All mixtures (precursors) are heat treated at 300° C. for 3 h in a tubular furnace in Ar gas to make sulfur melt and react with PAN. Then, PAN/S composite is obtained.

Figure 22:
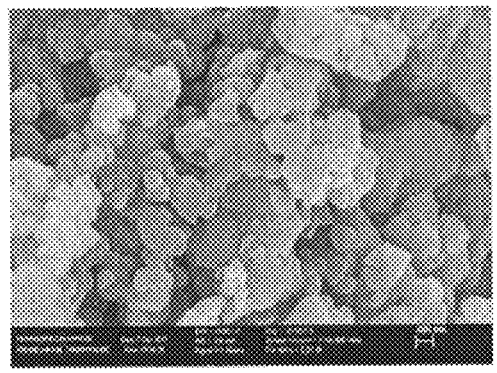
FIG. 22 shows SEM images of the PAN/S composite without heat treatment.
Figure 23:
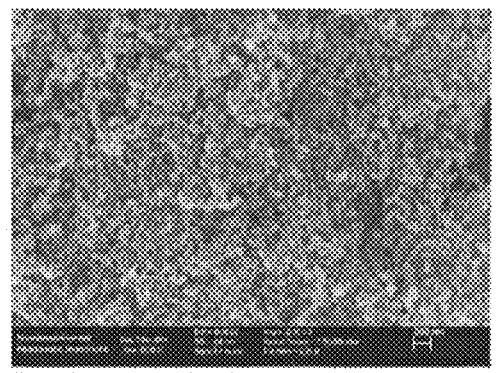
FIG. 23 shows SEM images of the PAN/S composite with heat treatment.

The morphology of the composite PAN/S is characterized by scanning electron microscopy (SEM, FE-SEM LEO 1530). SEM images of composite PAN/S without heat treatment and with heat treatment are presented in FIGS. 22 and 23, respectively. One can see that the size of the composite PAN/S without heat treatment is quite bigger than that of the composite PAN/S with heat treatment. The composite PAN/S surface is rough and consists of many agglomerated nano sized particles, which could enhance the PAN/S reactivity via increasing the available reactive surface area of the composite.

Example 23

PAN/S composite cathode is prepared by mixing 80 wt. % of PAN/S composite as an active material, 10 wt. % ketjen black (MTI, 99.5% purity) as a conductor, and 10 wt. % polyvinylidene fluoride (PVDF) (Kynar, HSV900) as a binder dissolved in N-methyl-2-pyrrolidene (NMP) (Sigma-Aldrich, ≥99.5% purity). The resulting slurry is spread onto circular nickel foam with 1 cm diameter and then vacuum dried at 60° C. for 12 h, the cathode electrode is pressed at 8 MPa by a hydraulic presser in order to achieve good contact between the active material and nickel foam. 1 M $LiPF_6$ in a solution of ethylene carbonate (EC):dimethyl carbonate (DMC):diethylene carbonate (DEC) (EC:DMC:DEC volume ratio=1:1:1) is used as the liquid electrolyte. The separator used here is a porous polypropylene membrane. The battery is assembled in a gloved box filled with high purity Ar.

Comparative Example 3

A battery is made according to a method similar to that described in example 23. However, in this case, ball milling is used for mixing the S and PAN instead of manual mixing.

The electrochemical performance of batteries in example 23 and comparative example 3 is tested.

The batteries are charged and discharged galvanostatically at 0.2 C (1 C=1672 mAh/g) between 1 and 3 V at room temperature. Specific capacities and current densities are calculated based on the amount of S in the cathode.

Figure 24:
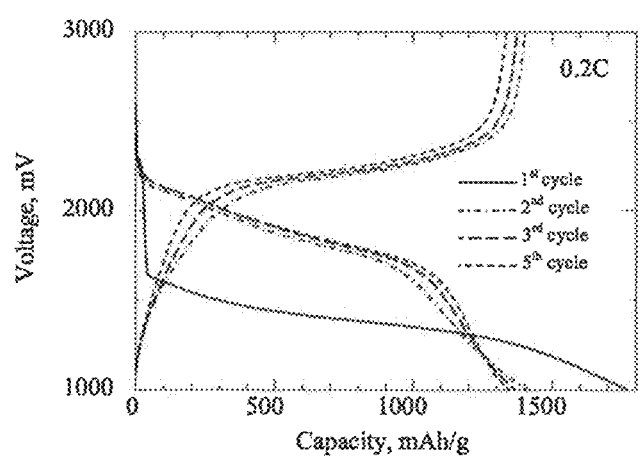
FIG. 24 shows the charge/discharge profiles of the battery at 0.2 C provided in example 23.
Figure 25:
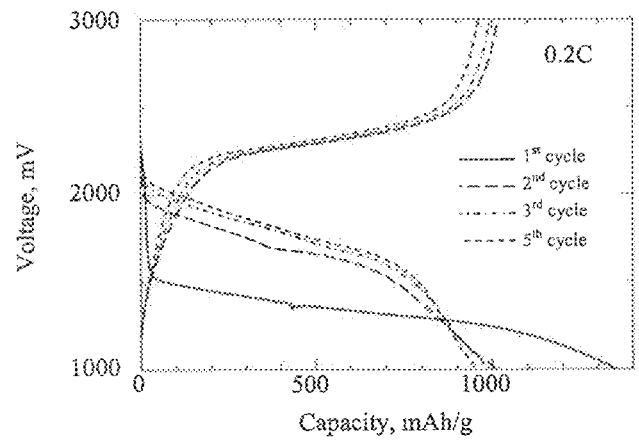
FIG. 25 shows the charge/discharge profiles of the battery provided in comparative example 3 at 0.2 C.

FIGS. 24 and 25 show the charge/discharge profiles of the batteries provided in example 23 and comparative example 3, respectively, at 0.2 C. From these figures we can see big difference, PAN/S without ball-milling delivered a stable discharge capacity at about 1300 mAh/g based on sulfur at the 5th cycle, which is higher than that of PAN/S with ball-milling (1000 mAh/g).

Figure 26:
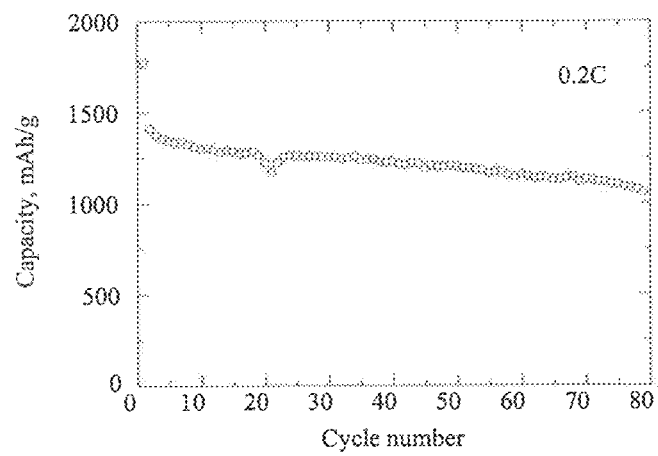
FIG. 26 shows the cycle ability of the battery provided in example 23.
Figure 27:
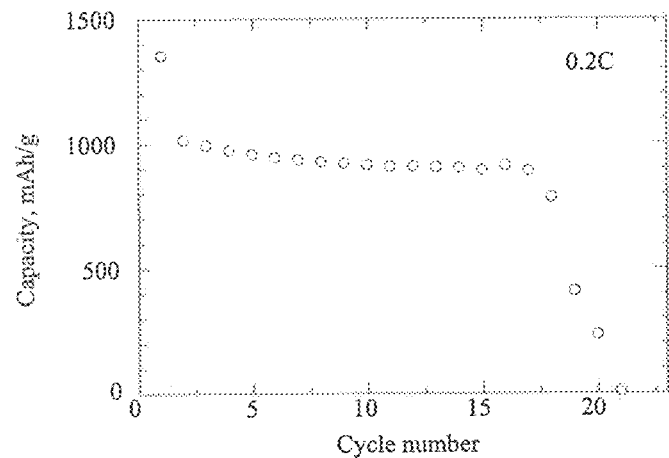
FIG. 27 shows the cycle ability of the battery provided in comparative example 3.

FIGS. 26 and 27 show the cycle ability of the batteries provided in example 23 and comparative example 3, respectively. It can be seen that battery with PAN/S composite without ball-milling in example 23 runs for longer cycle than battery with PAN/S composite with ball-milling.

Figure 28:
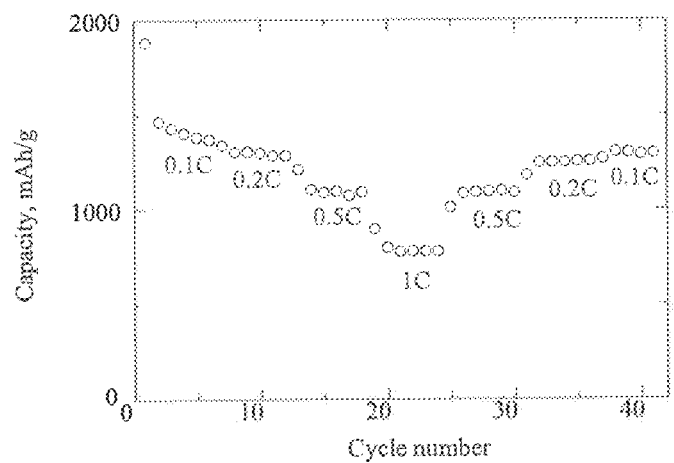
FIG. 28 shows the cycle ability of the battery containing PAN/S composite provided in example 23 at different current density.

FIG. 28 illustrates cycle ability of battery provided in example 23 at different current density. From FIG. 28 we can see that after high current density it can recover, it means it can handle high current density.

Example 24

Sulfur (Sigma-Aldrich, 100-mesh particle size) and PAN (Sigma-Aldrich, average MW=150,000) are mixed by ball milling (Fritsch, pulverisette 7) at a weight ratio of 4:1 for 5 h with ethanol as the dispersant. The resulting mixture is dried at 50° C. for 3 h in a vacuum oven and then annealed at 300° C. in Ar atmosphere. The heat treatment time is 0.5 h. Then, dehydrogenated S/DPAN composite is obtained.

The electrochemical performance of the S/DPAN composite is investigated using coin-type battery (CR2032). The composite cathode comprised 80 wt % S/DPAN with 10 wt % ketjenblack (EC600JD, Akzo Nobel) and the rest with polyvinylidene fluoride (PVdF) (Kynar, HSV900) as the binder. These materials are dispersed in NMP (Sigma-Aldrich, ≥99.5% purity). The resultant slurry is spread uniformly onto a circular nickel foam disc of 1 cm in diameter, then dried in a vacuum oven at 50° C. for 12 h. The average weight of S/DPAN composite is about 10-12 mg per electrode. Lithium metal is used as anode, while a microporous polypropylene film is separator. 1 M solution of LiPF6 in a mixed solvent of ethylene carbonate (EC), dimethyl carbonate (DMC), and diethylene carbonate (DEC) with 1:1:1 weight ratio (LP71, Merck Chemicals) is used as the liquid electrolyte. The coin battery is assembled in a Braun glove box filled with high purity argon gas.

The battery is tested galvanostatically on a multi-channel battery tester (BT-2000, Arbin) between 1 and 3 V at 0.2 C charge/discharge rate (current density=334.4 mA/g). CV is conducted between 1 and 3 V vs. $Li^+/Li$ at a scanning rate of 0.1 mV/s. The electrochemical tests are conducted at ambient temperature.

Example 25

A battery is made according to a method similar to that described in example 25. However, in this case, the heat treatment time is 2.5 h instead of 0.5 h.

A battery is made according to a method similar to that described in example 24. However, in this case, the heat treatment time is 2.5 h instead of 0.5 h.

Example 26

A battery is made according to a method similar to that described in example 24. However, in this case, the heat treatment time is 4 h instead of 0.5 h.

Comparative Example 4

A battery is made according to a method similar to that described in example 24. However, in this case, heat treatment is excluded after ball mixing of S and PAN.

Figure 29:
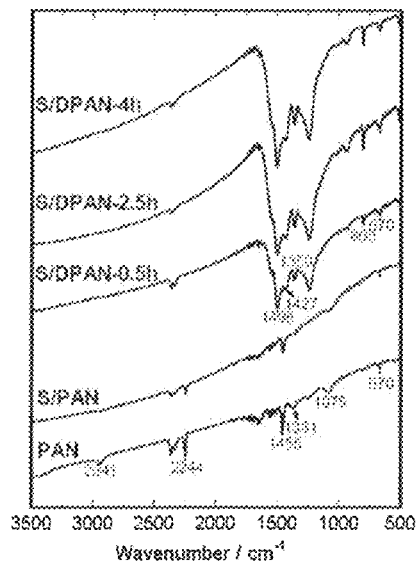
FIG. 29 shows the FTIR spectra of PAN and the composites provided in the example 24-26 and comparative example 4.

FIG. 29 shows the FTIR spectra of PAN and composites provided in example 24-26, comparative example 4. The characteristic peak at 2244 $cm^{-1}$ represents the —CN group, and the one at 1455 $cm^{-1}$ is related to the —$CH_2$ group, in the FTIR spectrum of PAN. The spectra of S/PAN and PAN are similar, indicating that there is no reaction between sulfur and PAN during ball-milling. After 0.5 h of heat treatment, these characteristic peaks no longer exist and are replaced by new peaks. The peak at 1498 $cm^{-1}$ represents the C=C double bond, and a —CH deformation is corresponded by a new peak at 1359 $cm^{-1}$. The formation of the cyclic structure is reflected by the peaks at 1427 $cm^{-1}$ and 803 $cm^{-1}$. The peak intensity significantly increases when heat treatment time increases from 0.5 to 2.5 h, and then slightly changes when heat treatment temperature increases from 2.5 to 4 h. The later fact indicates that there is no significant chemical transformation between 2.5 h and 4 h.

Figure 30:
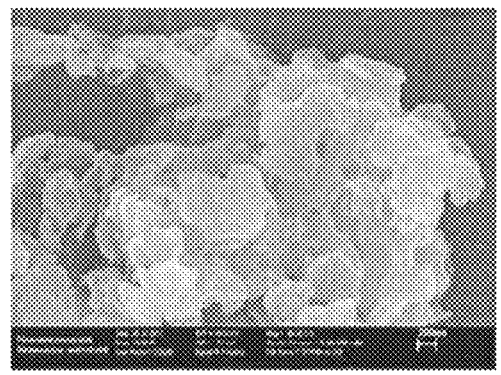
FIG. 30 shows the surface morphology of the composite S/DPAN provided in example 26 by FE-SEM.
Figure 31:
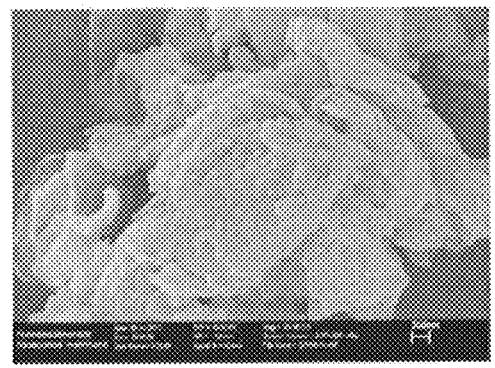
FIG. 31 shows the surface morphology of the composite S/PAN provided in comparative example 4 by FE-SEM.

The surface morphologies of the composite S/PAN provided in example 26 and comparative example 4 are studied by FE-SEM as shown in FIGS. 30 and 31, respectively. Both composites are aggregates consist of primary particles with particle sizes within 100-400 nm. However, their morphologies are quite distinguishable, indicating a major change during heat treatment.

Figure 32:
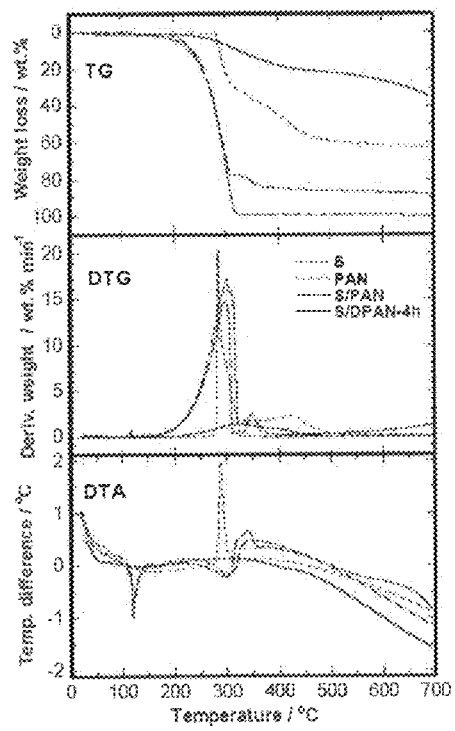
FIG. 32 shows the thermal behavior of S, PAN, composites S/DPAN and S/PAN by TG-DTA and its time derivative DTG.

FIG. 32 shows the thermal behavior of S, PAN, composites provided in example 26 and comparative example 4 which is studied by TG-DTA and its time derivative DTG. It can be seen from the figure that sufficient heat treatment time improves the thermal stability of the composites considerably, which can be ascribed to the formation of a highly stable structure in the composites.

Figure 33:
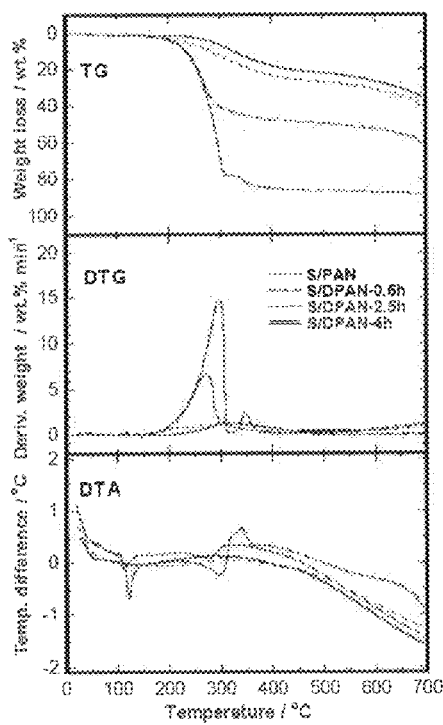
FIG. 33 shows the thermal behavior of S/PAN composites provided in example 24-26 and comparative example 4.

FIG. 33 shows the thermal behavior of S/PAN composites provided in example 24-26 and comparative example 4. This is a further proof of improving thermal stability of the mixtures by increasing heat treatment time, and S/PAN composites after heat treatment time of 2.5 h and 4 h have almost the same thermal behaviour.

Figure 34:
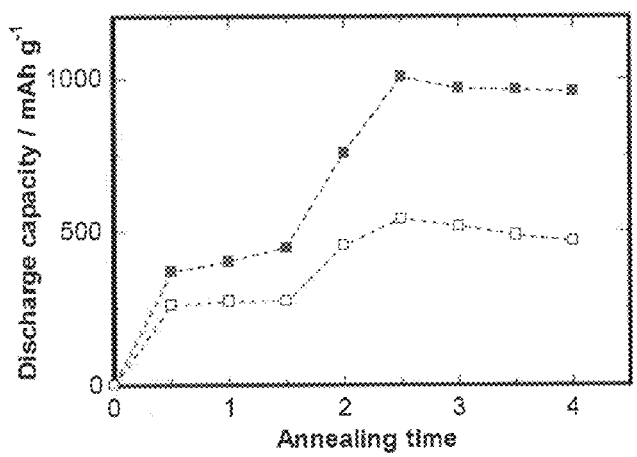
FIG. 34 shows the variation of specific discharge capacity at 5th cycle upon changing the heat treatment time, at 0.2 C.

FIG. 34 presents the variation of specific discharge capacity at $5^{th}$ cycle upon changing the heat treatment time, at 0.2 C. While almost no discharge capacity can be delivered by the S/PAN without heat treatment, annealing it for 0.5 h results in a specific discharge capacity of 370 mAh/g. The specific discharge capacity slightly increases with the heat treatment time of up to 1.5 h, and then drastically increases with the heat treatment time up to 2.5 h. For the heat treatment times longer than 2.5 h, the specific discharge capacity slightly decreased. There might be deterioration in the S/DPAN structure with further heat treatment. The black dots in FIG. 34 represent discharge capacity based on the content of sulfur in the cathode, while the black frames represent discharge capacity based on the weight of composite. Henceforth, 2.5 h is the optimum heat treatment time.

Figure 35:
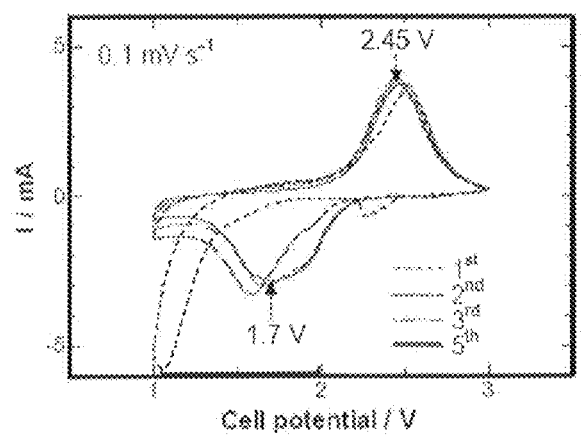
FIG. 35 shows the CV curves of the battery provided in example 25 with the scanning rate of 0.1 mV/s.
Figure 36:
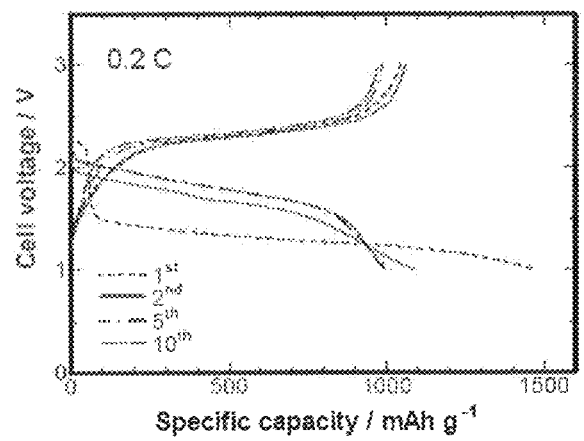
FIG. 36 shows the charge/discharge profiles of the battery provided in example 25 at the $1^{st}$, $2^{nd}$, $5^{th}$ and $10^{th}$ cycles.

FIG. 35 is CV curves of battery provided in example 25 with the scanning rate of 0.1 mV/s. FIG. 36 shows the charge/discharge profiles of battery provided in example 25 at the $1^{st}$, $2^{nd}$, $5^{th}$ and $10^{th}$ cycles.

Figure 37:
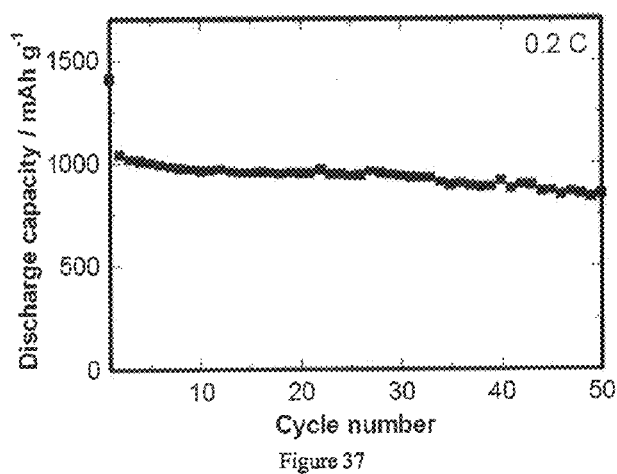
FIG. 37 shows the cycle ability of the battery provided in example 25.

FIG. 37 shows the cyclability of the battery provided in example 25. Discharge capacity of the battery gradually decreases with cycle number. Reversible capacity retention of 81.7% can be achieved after 50 cycles at 0.2 C.

Although the invention has been described with reference to certain specific embodiments, various modifications thereof will be apparent to those skilled in the art without departing from the purpose and scope of the invention as outlined in the claims appended hereto. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The disclosures of all prior art recited herein are incorporated herein by reference in their entirety.

We claim:

1. A heat-treated electrode composite material comprising $AB_xC_yD_z$, A being selected from at least one of polyacrylonitrile and polyacrylonitrile copolymer; B is sulfur; C is a carbon based material; and D is a mixture of MgO and NiO; wherein the weight ratios of A, B, C, and D are expressed as $AB_xC_yD_z$ and $1<x<20$, $0y<1$, and $0<z<1$.

2. The heat-treated electrode composite material according to claim 1, wherein y=0.

3. The heat-treated electrode composite material according to claim 1, wherein $0<y<1$.

4. The heat-treated electrode composite material according to claim 1, wherein A is the polyacrylonitrile copolymer and is selected from at least one of polyacrylonitrile methylmethacrylate copolymer and polyacrylonitrile polypyrrole copolymer.

5. The heat-treated electrode composite material according to claim 1, wherein the carbon based material is selected from at least one of ketjen black, Acetylene black, active carbon, single wall carbon nano-tube, multi wall carbon nano-tube and graphene.

6. A cathode for battery, comprising a heat-treated electrode composite material, the heat-treated electrode composite material comprising $AB_xC_yD_z$, A being selected from at least one of polyacrylonitrile and polyacrylonitrile copolymer; B is sulfur; C is a carbon based material; and D is a mixture of MgO and NiO; wherein the weight ratios of A, B, C, and D are expressed as $AB_xC_yD_z$ and $1<x<20$, $0y<1$, and $0<z<1$.

7. The cathode for battery according to claim 6, wherein y=0.

8. The cathode for battery according to claim 6, wherein $0<y<1$.

9. The cathode for battery according to claim 6, wherein A is the polyacrylonitrile copolymer and is selected from at least one of polyacrylonitrile methylmethacrylate copolymer and polyacrylonitrile polypyrrole copolymer.

10. The cathode for battery according to claim 6, wherein the carbon based material is selected from at least one of ketjen black, Acetylene black, active carbon, single wall carbon nano-tube, multi wall carbon nano-tube and graphene.

11. A battery, comprising a cathode, an anode and an electrolyte provided between the cathode and anode, the cathode comprising a cathode current collector and a heat-treated electrode composite material, the heat-treated electrode composite material comprising $AB_xC_yD_z$, A being selected from at least one of polyacrylonitrile and polyacrylonitrile copolymer; B is sulfur; C is a carbon based material; and D is a mixture of MgO and NiO; wherein the weight ratios of A, B, C, and D are expressed as $AB_xC_yD_z$ and $1<x<20$, $0y<1$, and $0<z<1$.

12. The battery according to claim 11, wherein y=0.

13. The battery according to claim 11, wherein $0<y<1$.

14. The battery according to claim 11, wherein A is the polyacrylonitrile copolymer and is selected from at least one of polyacrylonitrile methylmethacrylate copolymer and polyacrylonitrile polypyrrole copolymer.

15. The battery according to claim 11, wherein the carbon based material is selected from at least one of ketjen black, Acetylene black, active carbon, single wall carbon nano-tube, multi wall carbon nano-tube and graphene.

16. The battery according to claim 11, wherein the electrolyte is selected from one of polyvinylidene fluoride, polyvinylidene fluoride-poly(methyl methacrylate) copolymer, polyvinylidene fluoride-hexafluoropropylene copolymer, and polyethylene glycol boric acid ester polymers.

17. The battery according to claim 11, wherein the cathode current collector is selected from one of aluminum foil, nickel foam, and stainless steel net.

* * * * *

UNITED STATES PATENT AND TRADEMARK OFFICE
CERTIFICATE OF CORRECTION

PATENT NO. : 9,899,667 B2
APPLICATION NO. : 14/103042
DATED : February 20, 2018
INVENTOR(S) : Pu Chen et al.

It is certified that error appears in the above-identified patent and that said Letters Patent is hereby corrected as shown below:

On the Title Page

Item (71), the Application information should read:
Positec Power Tools (Suzhou) Co., Ltd, Suzhou (CN)
Pu Chen, Waterloo (CA)

In the Claims

Column 25, Line 52 (Claim 1): delete "$1<x<20, 0y<1$" insert therefor --$1 \leq x \leq 20, 0 \leq y < 1$--
Column 26, Line 15 (Claim 6): delete "$1<x<20, 0y<1$" insert therefor --$1 \leq x \leq 20, 0 \leq y < 1$--
Column 26, Line 39 (Claim 11): delete "$1<x<20, 0y<1$" insert therefor --$1 \leq x \leq 20, 0 \leq y < 1$--

Signed and Sealed this
Twenty-first Day of August, 2018

Andrei Iancu
*Director of the United States Patent and Trademark Office*